United States Patent [19]

Ando et al.

[11] Patent Number: 5,652,276
[45] Date of Patent: Jul. 29, 1997

[54] FOAMING RESIN COMPOSITION, PLASTIC FOAM FORMED FROM THE COMPOSITION, AND METHOD FOR FORMING THE PLASTIC FOAM

[75] Inventors: Hiroshi Ando; Kensuke Kondo; Naoaki Nakanishi; Hiroshi Ito; Shigeki Hamaguchi; Kazuya Yonezawa, all of Hyogo, Japan

[73] Assignee: Kanegafuchi Chemical Industry Co., Ltd., Osaka, Japan

[21] Appl. No.: 669,301

[22] PCT Filed: Nov. 15, 1995

[86] PCT No.: PCT/JP95/02335

§ 371 Date: Sep. 5, 1996

§ 102(e) Date: Sep. 5, 1996

[87] PCT Pub. No.: WO96/15194

PCT Pub. Date: May 23, 1996

[30] Foreign Application Priority Data

Nov. 15, 1994 [JP] Japan ................................ 6-280533

[51] Int. Cl.⁶ .................................................... C08J 9/06
[52] U.S. Cl. ...................... 521/88; 521/91; 521/110; 521/117; 521/142; 521/144; 521/148; 521/149; 521/150; 521/181; 521/182; 521/183; 521/189; 521/154

[58] Field of Search ......................... 521/88, 91, 110, 521/117, 142, 144, 148, 149, 150, 154, 181, 182, 183, 189

[56] References Cited

U.S. PATENT DOCUMENTS 4,810,728  3/1989  Gross et al. ............................ 521/82
4,943,596  7/1990  Gross et al. ............................ 521/82

FOREIGN PATENT DOCUMENTS 3-188166  8/1991  Japan .
3-200807  9/1991  Japan .
6-45713   6/1994  Japan .

*Primary Examiner*—Morton Foelak
*Attorney, Agent, or Firm*—Jordan and Hamburg

[57] ABSTRACT

A foaming resin composition consisting essentially of (A) an organic compound having a carbon-carbon double bond, (B) a compound having an SiH group, and (C) a compound having an OH group is foamed and cured at room temperature or under heat at relatively low temperatures, to obtain hard, semi-hard or soft plastic foam having good weather resistance and good compatibility with coating compositions and adhesives.

14 Claims, No Drawings

FOAMING RESIN COMPOSITION, PLASTIC FOAM FORMED FROM THE COMPOSITION, AND METHOD FOR FORMING THE PLASTIC FOAM

TECHNICAL FIELD

The present invention relates to a novel, foaming resin composition which can be foamed and cured at room temperature or under heat at relatively low temperatures to give plastic foam, to such plastic foam formed from the composition, and to a method for forming such plastic foam.

More precisely, the present invention relates to plastic foam favorably usable for acoustic insulation, heat insulation, water sealing, air sealing, damping, protection, cushioning, decoration, etc., to a method for forming such plastic foam, and to a foaming resin composition to be formed into such plastic foam. The plastic foam of the present invention is used in a broad range of applications. For vehicles, for example, the present invention is applicable to cushions, ceilings, cores in door trims, damping and sound-absorbing materials in floor cushions, heat-insulating materials in car coolers, air sealants in dampers, water-sealing parts, gaskets, air filters, center pillar garnishes, head linings, quarter light trims, dust covers, safety foam in fuel tanks, oil filters, flexible containers, crush pads, sun visors, head rests, insulators, dashboards, door panels, pillars, consoles, energy-absorbing bumper, heat-insulating materials in freezer vans, refrigerator vans, tank lorries, freezing and refrigerating container trucks, sound-absorbing materials in girder bridges, etc.; for ships, it is applicable to heat-insulating materials, buoyant materials, cores in FRP boards, buoys, etc.; for bedding, it is applicable to cushions, etc.; for furniture, it is applicable to cushions, packing materials, etc.; for electric and electronic instruments, it is applicable to filters, sound-absorbing and heat-insulating materials, sound-absorbing materials in printers, ear pads in headphones, etc.; for packages, it is applicable to shock absorbers; for building and construction, it is applicable to heat-insulating materials in roofs, ceilings, walls and floors, covers of water pipes, door panels, siding panels, cores in metal siding panels, cores in partitioning panels, cores in tatami (straw mats) and fusuma (papered sliding doors), heat-insulating cores in bath tubs, joints, sealants, adhesives, heat-insulating panels in system ceilings, heat-insulating and water-proofing materials in roofs, air-sealing and heat-insulating materials in refrigerator storehouses and airtight storehouses, heat-insulating materials in plant tanks and pipes, etc.; for household electric appliances, it is applicable to heat-sealing materials in refrigerators, freezers and electric jars, dew inhibitors in air conditioners, etc.; for daily necessaries, it is applicable to sports goods, medical appliances, powder puffs for cosmetics, shoulder pads, slippers, sandals, kenzans (pin holders), toys, etc. In addition, the foaming resin composition of the present invention, the plastic foam of the invention formed from the composition and the method of the invention for producing the plastic foam can be utilized in patterning of articles through injection molding, in formation of model samples using patterns and in formation of decorations and accessories.

BACKGROUND ART

Heretofore, various types of polymer foam of, for example, polystyrene, polyethylene, polypropylene and polyvinyl chloride are used as foam beads, foam sheets and foam boards in various fields of civil engineering, building, construction, packaging, household electric appliances, vehicles, etc., as being lightweight and having excellent heat-insulating and shock-absorbing properties. However, these are problematic in that the formation of such polymer foam through foaming requires much energy and foaming in place is impossible.

On the other hand, the formation of plastic foam through injection or spraying in place is more advantageous than the use of so-called, pre-shaped foam articles, since airtight heat insulators with high heat insulating capacity can be obtained, the period of execution of construction works using plastic foam can be shortened and the carriage on plastic foam can be reduced. As one typical example, mentioned is urethane foam. To produce it, for example, there are known a method of using a foaming agent such as flon and a method of using carbon dioxide to be generated in the presence of water. The latter is being employed in these days. However, the plastic foam to be produced in such methods is problematic in that its weather resistance is poor so that it cannot be used as exterior parts to be exposed to sun light, that some isocyanates to be used in forming it are toxic and harmful in working operations, and that it generates toxic gas when fired. In addition, since particular flon gas will destroy the ozone layer, safer gas than this shall be used. The technique of using water as a substituent for the foaming agent is not completely established as yet. Other organic foaming agents are dangerous as often causing fires during their use. For these reasons, it is desired to develop safer and more advantageous means of forming plastic foam.

Silicone foam comprising a polysiloxane compound has been proposed as one example of plastic foam which has higher weather resistance than urethane foam. This is produced by foaming a polysiloxane-containing, foaming composition by the action of hydrogen gas that is generated through the condensation of the hydrosilyl group of the hydrosilyl-containing polysiloxane in the composition with the silanol group of the silanol-containing polysiloxane therein or with the hydroxyl group of the alcoholic compound therein, followed by curing the resulting pre-foam through the condensation of the hydrosilyl group with the silanol group or through the hydrosilylation of the unsaturated group of the unsaturated polysiloxane in the composition with the hydrosilyl group. This is used as heat insulators, electric insulators and potting materials.

We, the present inventors used silicone foam in producing sealants, and interior and exterior parts in civil engineering, building and construction works and in producing model samples, decorations and accessories but found that silicone foam repels coating compositions, especially aqueous coating compositions of which the use is increasing in these days, and it is difficult to coat silicone foam with ordinary coating compositions. We further found that it is impossible to adhere other substrates and parts, such as siding board and wallpaper, to silicone foam with ordinary adhesives.

Moreover, since silicone foam consists essentially of a polysiloxane having a low Tg and high flexibility, only soft silicone foam is available in practical use. Such soft silicone foam cannot be a substituent for hard and semi-hard urethane foam in the field where high compression strength is required.

In addition, since polysiloxane compounds to be used in producing silicone foam are more expensive than other organic materials usable in producing plastic foam and since such expensive, polysiloxane-containing, foaming compositions can be expanded only up to 10 times or so, silicone foam is generally expensive and is not advantageous even in the field where high compression strength is not required. Silicone foam is thus problematic in that it can be utilized only for a limited particular application, for example, to nuclear plants where extremely high flame retardancy is required. Given the situations, a technique of reducing the cost of such silicone foam per its unit volume by increasing the expansion ratio thereof is desired and is being studied. However, even if silicone foam with a high expansion ratio of 15 times or more is desired, it is difficult to attain such a sufficient and high expansion ratio. Even if highly-expanded silicone foam could be produced from particular foaming compositions, such is extremely brittle and could not be put into practical use.

Japanese Patent Publication No. 6-45713 discloses a foaming silicone composition which comprises a silicone-polyimide block copolymer having organovinylsiloxane units and which can be foamed to give silicone foam with an increased tensile strength. However, since the composition disclosed comprises a component having a siloxane skeleton moiety and a carbon-carbon double bond moiety in the molecule, the silicone foam to be formed from this is still problematic in that it repels coating compositions and cannot be safely adhered to other substrates with ordinary adhesives, like the conventional silicone foam as mentioned above.

Japanese Laid-Open Patent Application No. 3-188166 discloses a curable composition comprising (A) an organic polymer having at least one alkenyl group in the molecule, (B) an organic polymer having at least two hydrosilyl groups in the molecule, (C) a catalyst for hydrosilylation and (D) a storage stability improving agent. As examples of the storage stability improving agent, referred to therein are compounds having an aliphatic double bond. One of them is propargyl alcohol. One of many applications of the curable composition is to produce foam sealants. However, no disclosure is given therein referring to and demonstrating the production of plastic foam from the composition comprising propargyl alcohol as the component (D).

The present invention has been made in consideration of the above, and its object is to provide plastic foam which has good weather resistance, to which are applicable coating compositions and adhesives, which does not generate any harmful gas when fired, which can be a substituent for hard, semi-hard and soft urethane foam and which has an expansion ratio of 2 times or more, at which it can exhibit its advantageous characteristics, and to provide a method for producing the plastic foam. The invention also provides a foaming resin composition which can be foamed and cured at room temperature or under heat at relatively low temperatures to give the plastic foam. Thus, the composition can be foamed and cured in place to give the plastic foam. In addition, since the composition contains no isocyanate component, it is not so toxic. Moreover, the cost of the plastic foam per the unit volume is relatively low, and the plastic foam can be used in a broad range of applications as a substituent for urethane foam.

DISCLOSURE OF THE INVENTION

The foaming resin composition of the present invention consists essentially of (A) an organic compound having a carbon-carbon double bond but having no siloxane unit in the molecular skeleton, (B) a compound having an SiH group, and (C) a compound having an OH group.

In the foaming resin composition of the present invention, the component (B) reacts with the component (C) to give hydrogen gas, with which the composition is foamed, and the component (A) is hydrosilylated with the component (B) through addition-crosslinking reaction to give an Si—C bond capable of exhibiting good weather resistance, through which the foamed composition is cured to give plastic foam having good weather resistance.

Since the foaming resin composition of the present invention comprises, as the component (A), an organic compound having no siloxane unit in the molecular skeleton, can be foamed and cured to give plastic foam having higher compression strength, coating applicability, adhesive applicability, staining resistance and dust adhesion resistance than silicone foam. Although the composition of the invention is cured through addition reaction, like that for silicone foam in the prior art mentioned hereinabove, it differs from the composition for such silicone foam in that the latter comprises a polysiloxane compound as the component having a carbon-carbon double bond and that the major part of the composition comprises polysiloxanes. According to the present invention, it is possible to obtain hard, semi-hard and soft plastic foam having different physical properties in a broad range, by varying the component (A) in the foaming composition. Since the organic compound of the component (A) contains no siloxane bond in the molecular skeleton, many of the compounds are relatively low-priced. As a result, it is possible to obtain low-priced plastic foam according to the present invention. In addition, it is also possible to further lower the cost of the plastic foam of the invention per the unit volume, by increasing the expansion ratio of the foaming composition.

The components (A) to (C) are described hereinunder in order.

As the component (A), used is an organic compound having a carbon-carbon double bond but having no siloxane unit in the molecular skeleton (hereinafter referred to as "skeleton").

The molecular structure of the compound of the component (A) may be divided into the skeleton moiety and the alkenyl group which has a carbon-carbon double bond and is bonded to the skeleton through covalent bond, in which the alkenyl group with a carbon-carbon double bond may be at any position but is preferably at the side chain or at the terminal in view of the reactivity of the compound.

The organic compound of the component (A) should not contain any siloxane unit (Si—O—Si) such as that in polysiloxane-organic block copolymers and polysiloxane-organic graft copolymers, in order that the plastic foam of the invention can have good gas sealability and does not repel the materials as applied thereto, but may have any ordinary organic polymer or monomer skeleton with no particular limitation provided that the skeleton consists of one or more constitutive elements selected from only carbon, oxygen, hydrogen, nitrogen, sulfur and halogen atoms. For example, the skeleton includes polyethers, polyesters, polycarbonates, saturated hydrocarbons, polyacrylates, polyamides, and phenol-formaldehyde resins (phenolic resins). The monomer skeleton includes, for example, phenols, bisphenols, and their mixtures.

Of these, polyether polymer skeletons are preferably employed in order to obtain soft plastic foam. Examples thereof include polyoxyethylene, polyoxypropylene, polyoxytetramethylene, and polyoxyethylene-polyoxypropylene copolymers. One specific example thereof is represented by:

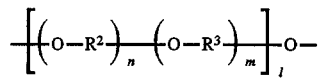

wherein $R^2$ and $R^3$ each represent a divalent organic group having from 1 to 6 carbon atoms and composed of constitutive elements selected from only C, H, N, O, S and halogens; and n, m and 1 each represent from 1 to 300.

Other polymer skeletons having a higher Tg than polysiloxane skeletons are also preferably used to obtain the plastic foam of the present invention. These include, for example, polyesters to be obtained through condensation of a dibasic acid, such as adipic acid, phthalic acid, isophthalic acid, terephthalic acid and hexahydrophthalic acid, with a glycol, such as ethylene glycol, diethylene glycol, propylene glycol, tetramethylene glycol and neopentyl glycol, or through ring-cleaving polymerization of lactones; ethylene-propylene copolymers; polyisobutylenes; isobutylene-isoprene copolymers; polychloroprenes; polyisoprenes; copolymers of isoprene with butadiene, acrylonitrile or styrene; polybutadienes; copolymers of butadiene with styrene or acrylonitrile; polyolefinic (saturated hydrocarbon) polymers to be obtained by hydrogenating polyisoprenes, polybutadienes or copolymers of isoprene or butadiene with acrylonitrile or styrene; polyacrylates to be obtained through radical polymerization of monomers such as ethyl acrylate and butyl acrylate; acrylate copolymers of acrylates, such as ethyl acrylate and butyl acrylate, with vinyl acetate, acrylonitrile, methyl methacrylate or styrene; graft polymers to be obtained by grafting vinyl monomers onto the above-mentioned polymers; polysulfides; polyamides, such as nylon 6 to be obtained through ring-cleaving polymerization of ε-aminocaprolactam, nylon 66 to be obtained through polycondensation of hexamethylenediamine with adipic acid, nylon 610 to be obtained through polycondensation of hexamethylenediamine with sebacic acid, nylon 11 to be obtained through polycondensation of ε-aminoundecanoic acid, nylon 12 to be obtained through ring-cleaving polymerization of ε-aminolaurolactam, nylon copolymers comprising two or more nylon components such as those mentioned above; polycarbonates such as those to be obtained through polycondensation of bisphenol A and carbonyl chloride; diallyl phthalate polymers; as well as phenol-formaldehyde resins (phenolic resins), such as novolak-type phenolic resins, resol-type phenolic resins, ammonia-resol-type phenolic resins, and benzylic ether-type phenolic resins.

An alkenyl group with a carbon-carbon double bond is introduced into these polymer skeletons to give the compounds for the component (A).

The alkenyl group is not specifically defined, provided that it can be hydrosilylated with the component (B) through addition reaction. In view of its reactivity, the alkenyl group is preferably represented by the following general formula (1):

$$CH_2=C-R^1 \qquad (1)$$

wherein $R^1$ represents a hydrogen atom or a methyl group.

In view of its availability, the group is more preferably represented by:

$$CH_2=C-H$$

The alkenyl group shall be bonded to the skeleton of the compound of the component (A) via a divalent or higher poly-valent substituent. The substituent is not specifically defined, provided that it is composed of at least one or more constitutive elements selected from only C, H, N, O, S and halogen atoms and has from 0 to 10 carbon atoms. It includes, for example, the following:

-continued

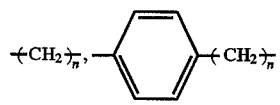

(n: 1 to 10) (n: 1 to 4)

If desired, two or more of these divalent or higher polyvalent groups can be bonded to each other through covalent bond to form one divalent or higher polyvalent substituent.

To introduce an alkenyl group into polymer skeletons, various known methods can be employed, which may be grouped into two. One is to introduce an alkenyl group into polymers after polymerization, and the other is to introduce it thereinto during polymerization.

As an example of the former, an organic polymer having a functional group such as a hydroxyl group, an alkoxide group, a carboxyl group or an epoxy group at its terminal, main chain or side chain is reacted with an organic compound having both an active group with reactivity with the functional group and an alkenyl group, thereby introducing the alkenyl group into the terminal, main chain or side chain of the polymer.

As examples of the organic compound having both an active group with reactivity with the functional group of such polymers and an alkenyl group, mentioned are $C_3$–$C_{20}$ unsaturated fatty acids, halides and anhydrides, such as acrylic acid, methacrylic acid, vinylacetic acid, acrylic acid chloride, acrylic acid bromide; $C_3$–$C_{20}$ unsaturated aliphatic alcohol-substituted carbonic acid halides such as allyl chloroformate ($CH_2$=$CHCH_2OCOCl$), allyl bromoformate ($CH_2$=$CHCH_2OCOBr$); as well as allyl chloride, allyl bromide, vinyl(chloromethyl)benzene, allyl(chloromethyl)benzene, allyl(bromomethyl)benzene, allyl(chloromethyl)ether, allyl(chloromethoxy)benzene, 1-butenyl (chloromethyl) ether, 1-hexenyl(chloromethoxy)benzene, allyloxy(chloromethyl)benzene, and allyl isocyanate.

An alkenyl group can be introduced into polymers through interesterification, which is to interesterify the alcohol residue in the ester moiety of a polyester resin or an acrylic resin with an alkenyl group-containing alcohol derivative or an alkenyl group-containing phenol derivative in the presence of an interesterification catalyst. The alkenyl group-containing alcohol derivative and the alkenyl group-containing phenol derivative which may be used for the interesterification with the alcohol residue may be any alcohol and phenol derivatives having at least one alkenyl group and at least one hydroxyl group. The catalyst may not be used. If used, however, it is preferably a titanium or tin catalyst.

As examples of the alcohol and phenol derivatives, mentioned are vinyl alcohol, allyl alcohol, 3-buten-1-ol, 4-penten-1-ol, 5-hexen-1-ol, 6-hepten-1-ol, 7-octen-1-ol, 8-nonen-1-ol, 9-decen-1-ol, 2-(allyloxy) ethanol, neopentyl glycol monoallyl ether, glycerin diallyl ether, trimethylolpropane diallyl ether, trimethylolethane diallyl ether, pentaerythritol allyl ether, 1,2,6-hexanetriol diallyl ether, sorbitol diallyl ether, as well as the following:

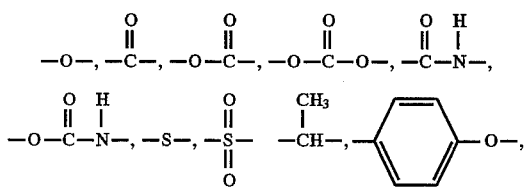

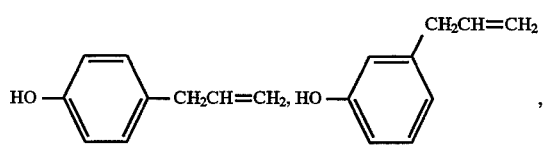

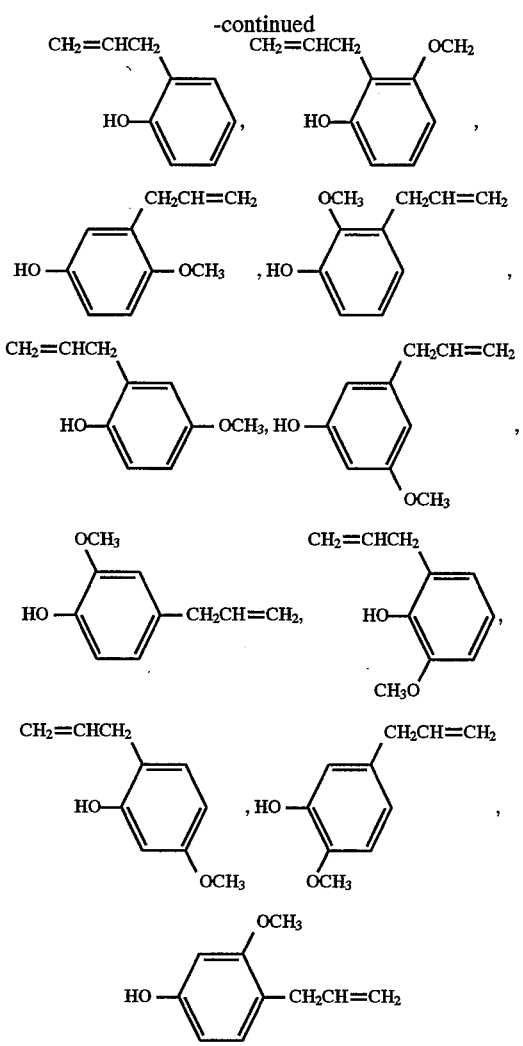

Of these, preferred are allyl alcohol, vinyl alcohol, 3-buten-1-ol, 2-(allyloxy)ethanol and the following:

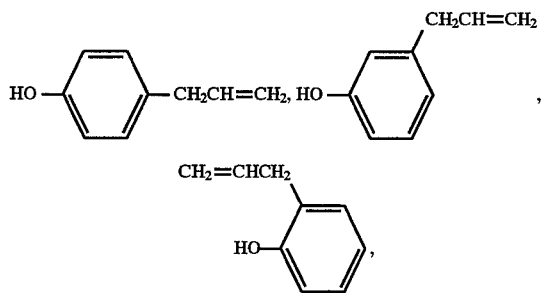

in view of their availability.

Also employable is a method of introducing an alkenyl group into polymers, in which an ester, for example an acetate of an alcohol or phenol derivative is interesterified with the ester moiety of a polyester resin or an acrylic resin in the presence of an interesterification catalyst, while removing the resulting low-molecular ester, such as the acetate of the alcohol residue from the ester moiety of the polyester resin or the acrylic resin, from the reaction system through distillation or vaporization to be conducted under reduced pressure.

It is also possible to introduce an alkenyl group into the living terminal of a living polymer as prepared through living polymerization of methyl (meth)acrylate, by blocking the living terminal of the polymer with a compound having an alkenyl group.

One example of introducing an alkenyl group into polymers during polymerization is referred to. Where the organic polymer skeleton for the component (A) for use in the present invention is prepared through radical polymerization, a vinyl monomer having an alkenyl group with low radical reactivity, such as allyl methacrylate or allyl acrylate, and a radical chain transfer agent having an alkenyl group with low radical reactivity, such as allylmercaptan, are used, with which an alkenyl group can be introduced into the side chain or the terminal of the organic polymer skeleton for the component (A).

Examples of the organic polymer skeleton for the component (A) having an alkenyl group as introduced into its side chain or terminal include the following:

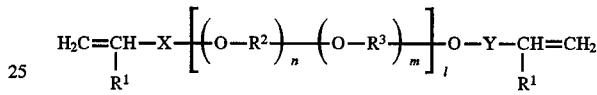

wherein $R^1$ represents H or $CH_3$; $R^2$ and $R^3$ each represent a divalent organic group having from 1 to 6 carbon atoms and composed of constitutive elements selected from only C, H, N, O, S and halogens; X and Y each represent a divalent substituent having from 0 to 10 carbon atoms and composed of constitutive element(s) selected from only C, H, N, O, S and halogens; and n, m and l each represent from 1 to 300.

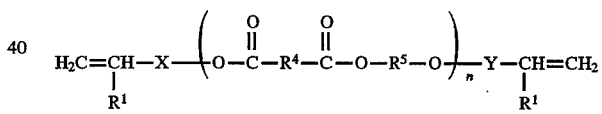

wherein $R^1$ represents H or $CH_3$; $R^4$ and $R^5$ each represent a divalent organic group having from 1 to 6 carbon atoms and composed of constitutive elements selected from only C, H, N, O, S and halogens; X and Y each represent a divalent substituent having from 0 to 10 carbon atoms and composed of constitutive element(s) selected from only C, H, N, O, S and halogens; and n, m and l each represent from 1 to 300.

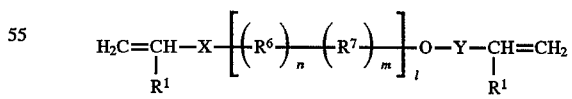

wherein $R^1$ represents H or $CH_3$; $R^6$ and $R^7$ each represent a divalent organic group having from 2 to 20 carbon atoms and composed of constitutive elements selected from only C, H, N, O, S and halogens; X and Y each represent a divalent substituent having from 0 to 10 carbon atoms and composed of constitutive element(s) selected from only C, H, N, O, S and halogens; and n, m and l each represent from 1 to 300.

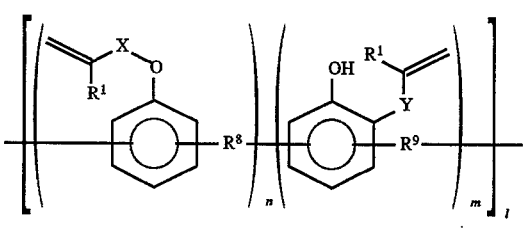

wherein $R^1$ represents H or $CH_3$; $R^8$ and $R^9$ each represent a divalent organic group having from 1 to 6 carbon atoms and composed of constitutive elements selected from only C, H, N, O, S and halogens; X and Y each represent a divalent substituent having from 0 to 10 carbon atoms and composed of constitutive element(s) selected from only C, H, N, O, S and halogens; and n, m and 1 each represent from 1 to 300.

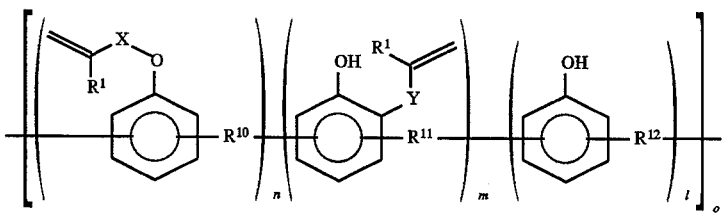

wherein $R^1$ represents H or $CH_3$; $R^{10}$, $R^{11}$ and $R^{12}$ each represent a divalent organic group having from 1 to 6 carbon atoms and composed of constitutive elements selected from only C, H, N, O, S and halogens; X and Y each represent a divalent substituent having from 0 to 10 carbon atoms and composed of constitutive element(s) selected from only C, H, N, O, S and halogens; and n, m, 1 and o each represent from 1 to 300.

The introduction of an alkenyl group into monomer skeletons derived from phenol compounds and bisphenol compounds can be conducted in accordance with any of the above-mentioned methods of introducing an alkenyl group into polymers after polymerization.

Phenol compounds into which an alkenyl group is introduced include, for example, phenol, cresol, xylenol, resorcinol, catechol, and pyrogallol. Bisphenol compounds into which an alkenyl group is introduced include, for example, bisphenol A, bisphenol F, bisphenol S, and tetrabromobisphenol A.

As specific examples of the component (A) to be prepared by introducing an alkenyl group into the above- mentioned monomer skeletons, mentioned are compounds of the following general formula:

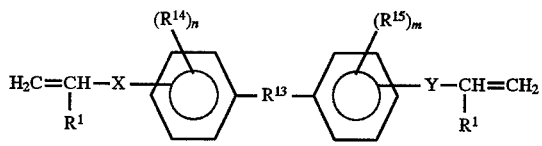

wherein $R^1$ represents H or $CH_3$; $R^{13}$ represents a divalent organic group having from 0 to 6 carbon atoms and composed of constitutive element(s) selected from only C, H, N, O, S and halogens; X and Y each represent a divalent substituent having from 0 to 10 carbon atoms and composed of constitutive element(s) selected from only C, H, N, O, S and halogens; $R^{14}$ and $R^{15}$ each represent a monovalent organic group having from 0 to 10 carbon atoms and composed of constitutive element (s) selected from only C, H, N, O, S and halogens; and n and m each represent from 0 to 4.

For the component (A), employable are low-molecular compounds having two or more carbon-carbon double bonds in one molecule, such as butadiene, isoprene, decadiene, diallyl phthalate, trimethylolpropane triallyl ether, pentaerythritol tetraallyl ether, 1,3-diisopropenylbenzene and 1,4-diisopropenylbenzene, either singly or as combined with any other compounds. The use of such low-molecular compounds results in the increase in the crosslink density of the plastic foam of the invention.

It is desirable that the number of the carbon-carbon double bonds in the component (A) is more than 1.0, especially preferably not less than 2, on average in one molecule. If the number of the carbon-carbon double bonds in one molecule of the component (A) is not more than 1, the reaction of the component (A) with the component (B) produces only a grafted structure but not a crosslinked structure.

It is also desirable that the component (A) is fluid at 100° C. or lower in order that it can be uniformly mixed with the other components, that constitutes the foaming composition of the invention, to be able to give plastic foam through spraying or injection of the composition. The structure of the compound for the component (A) may be either linear or branched and its molecular weight is not specifically defined. Preferably, however, the compound has a molecular weight of approximately from 100 to 100,000. Alkenyl group-containing organic polymers having a molecular weight of from 500 to 20,000 are especially preferred for the component (A). If those having a molecular weight of less than 500 are used, it is difficult for the organic polymers to exhibit their characteristics to make the resulting plastic foam flexible, and if those having a molecular weight of more than 100,000 are used, the crosslinking between the alkenyl group of the polymer and the SiH group of the component (B) is often difficult.

Next, the compound having an SiH group (hydrosilyl group) for the component (B) is described hereinunder. The hydrosilyl group-having compound for the component (B) for use in the present invention includes, for example, linear or cyclic polyorganohydrogensiloxanes to be represented by any of the following structural formulae (2) to (10) (including their polyoxyalkylene-modified derivatives, styrene-modified derivatives and olefin-modified derivatives):

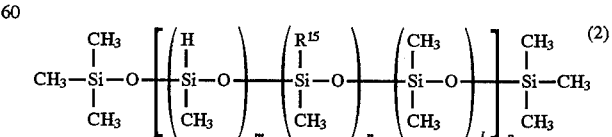

wherein $10 \leq (m+n+l) \times p \leq 80$; $m \geq 2$; n, 1, $p \geq 0$; $R^{15}$ represents a polyoxyalkylene chain having a molecular weight of from 100 to 10,000, or a hydrocarbon group having from 2 to 20 carbon atoms, optionally having one or more phenyl groups.

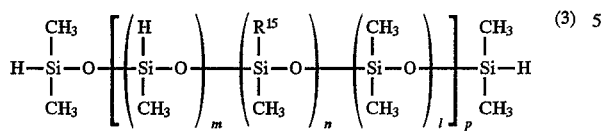
(3)

wherein $10 \leq (m+n+l) \times p \leq 80$; $m, n, l, p \geq 0$; $R^{15}$ represents a polyoxyalkylene chain having a molecular weight of from 100 to 10,000, or a hydrocarbon group having from 2 to 20 carbon atoms, optionally having one or more phenyl groups.

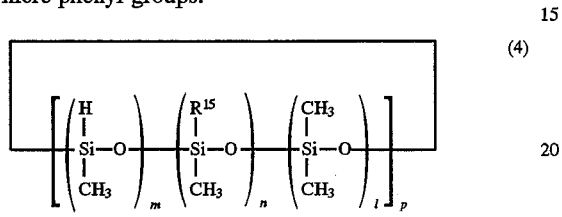
(4)

wherein $3 \leq (m+n+l) \times p \leq 20$; $m \geq 2$; $n, l, p \geq 0$; $R^{15}$ represents a polyoxyalkylene chain having a molecular weight of from 100 to 10,000, or a hydrocarbon group having from 2 to 20 carbon atoms, optionally having one or more phenyl groups.

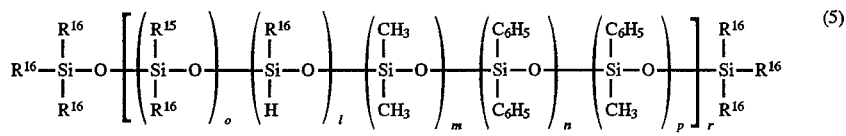
(5)

wherein $10 \leq (m+n+l+o+p) \times r \leq 80$; $l \geq 2$; $m, n, o, p \geq 0$; $R^{15}$ represents a polyoxyalkylene chain having a molecular weight of from 100 to 10,000, or a hydrocarbon group having from 2 to 20 carbon atoms, optionally having one or more phenyl groups; $R^{16}$ represents any of a methyl group, a phenyl group, and a hydrogen atom.

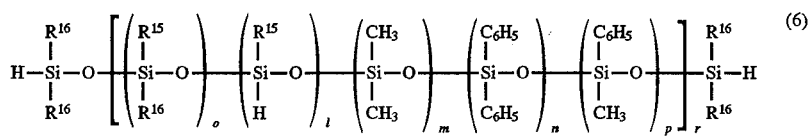
(6)

wherein $10 \leq (m+n+l+o+p) \times r \leq 80$; $m, n, l, o, p \geq 0$; $R^{15}$ represents a polyoxyalkylene chain having a molecular weight of from 100 to 10,000, or a hydrocarbon group having from 2 to 20 carbon atoms, optionally having one or more phenyl groups; $R^{16}$ represents any of a methyl group, a phenyl group, and a hydrogen atom.

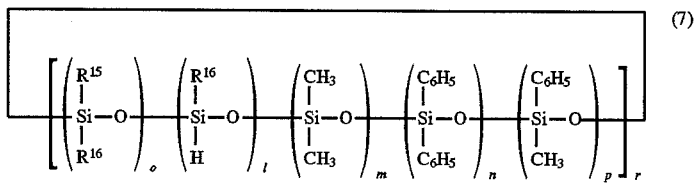

wherein $3 \leq (m+n+l+o+p) \times r \leq 20$; $l \geq 2$; m, n, o, $p \geq 0$; $R^{15}$ represents a polyoxyalkylene chain having a molecular weight of from 100 to 10,000, or a hydrocarbon group having from 2 to 20 carbon atoms, optionally having one or more phenyl groups; $R^{16}$ represents any of a methyl group, a phenyl group, and a hydrogen atom.

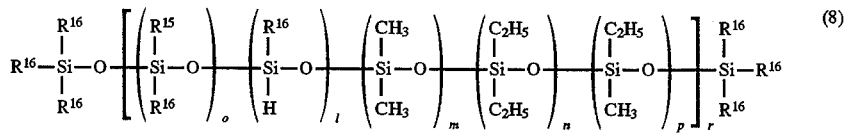

wherein $10 \leq (m+n+l+o+p) \times r \leq 80$; $l \geq 2$; m, n, o, $p \geq 0$; $R^{15}$ represents a polyoxyalkylene chain having a molecular weight of from 100 to 10,000, or a hydrocarbon group having from 2 to 20 carbon atoms, optionally having one or more phenyl groups; $R^{16}$ represents any of a methyl group, a phenyl group, and a hydrogen atom.

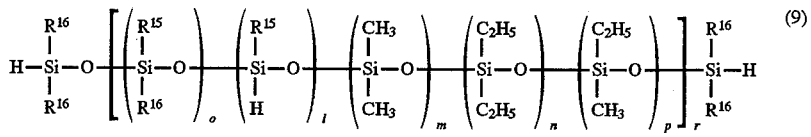

wherein $10 \leq (m+n+l+o+p) \times r \leq 80$; m, n, l, o, $p \geq 0$; $R^{15}$ represents a polyoxyalkylene chain having a molecular weight of from 100 to 10,000, or a hydrocarbon group having from 2 to 20 carbon atoms, optionally having one or more phenyl groups; $R^{16}$ represents any of a methyl group, a phenyl group, and a hydrogen atom.

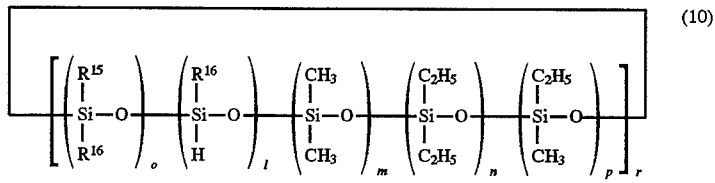

wherein $3 \leq (m+n+l+o+p) \times r \leq 20$; $l \geq 2$; m, n, o, $p \geq 0$; $R^{15}$ represents a polyoxyalkylene chain having a molecular weight of from 100 to 10,000, or a hydrocarbon group having from 2 to 20 carbon atoms, optionally having one or more phenyl groups; $R^{16}$ represents any of a methyl group, a phenyl group, and a hydrogen atom.

Where compounds for the component (B) as derived from such linear or cyclic polyorganohydrogensiloxane by partially modifying their hydrosilyl groups are used, it is possible to control the compatibility of the component (B) with both the component (A) and the component (C). The modification as referred to herein includes hydrosilylation of the compound with a compound having a terminal double bond (for example, an allyl group) and re-partitioning of the compound with a modified organic polysiloxane.

As examples of the modification, mentioned are hydrosilylation of a linear or cyclic polyorganohydrogensiloxane of any of formulae (11) to (13):

$$\text{CH}_3-\underset{\underset{\text{CH}_3}{|}}{\overset{\overset{\text{CH}_3}{|}}{\text{Si}}}-\text{O}-\left[\left(\underset{\underset{\text{CH}_3}{|}}{\overset{\overset{\text{H}}{|}}{\text{Si}}}-\text{O}\right)_m \left(\underset{\underset{\text{CH}_3}{|}}{\overset{\overset{R^{17}}{|}}{\text{Si}}}-\text{O}\right)_n \left(\underset{\underset{\text{CH}_3}{|}}{\overset{\overset{\text{CH}_3}{|}}{\text{Si}}}-\text{O}\right)_l\right]_p \underset{\underset{\text{CH}_3}{|}}{\overset{\overset{\text{CH}_3}{|}}{\text{Si}}}-\text{CH}_3 \quad (11)$$

wherein $10 \leq (m+n+l) \times p \leq 80$; $m \geq 3$; n, $l \geq 0$, $p \geq 1$; $R^{17}$ represents any of a methyl group, an ethyl group, and a phenyl group, $$\text{H}-\underset{\underset{\text{CH}_3}{|}}{\overset{\overset{\text{CH}_3}{|}}{\text{Si}}}-\text{O}-\left[\left(\underset{\underset{\text{CH}_3}{|}}{\overset{\overset{\text{H}}{|}}{\text{Si}}}-\text{O}\right)_m \left(\underset{\underset{\text{CH}_3}{|}}{\overset{\overset{R^{17}}{|}}{\text{Si}}}-\text{O}\right)_n \left(\underset{\underset{\text{CH}_3}{|}}{\overset{\overset{\text{CH}_3}{|}}{\text{Si}}}-\text{O}\right)_l\right]_p \underset{\underset{\text{CH}_3}{|}}{\overset{\overset{\text{CH}_3}{|}}{\text{Si}}}-\text{H} \quad (12)$$

wherein $10 \leq (m+n+l) \times p \leq 80$; m, $p \geq 1$; n, $l \geq 0$, $R^{17}$ represents any of a methyl group, an ethyl group, and a phenyl group,

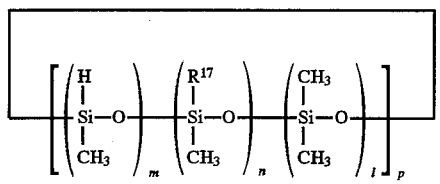

(13)

wherein $3 \leq (m+n+l) \times p \leq 20$; $m \geq 2$; n, $l \geq 0$, $p \geq 1$; $R^{17}$ represents any of a methyl group, an ethyl group, and a phenyl group,
with a compound having a terminal double bond, such as any of the following:

$H_2C = C(CH_3) - Ph$ $H_2C = CHCH_2 - [(PO)_n - (EO)_m]_l - OH$ $H_2C = CHCH_2 - [(PO)_n - (EO)_m]_l - OCH_3$ $H_2C = CHCH_2 - [(PO)_n - (EO)_m]_l - OC_2H_5$ $H_2C = CHCH_2 - [(PO)_n - (EO)_m]_l - OC_3H_7$ $H_2C = CHCH_2 - [(PO)_n - (EO)_m]_l - OC_4H_9$ $H_2C = CHCH_2 - [(PO)_n - (EO)_m]_l - OPh$ $(1 \leq (m+n) \times l \leq 80, m, n, l \geq 0)$ and re-partitioning with equilibration of a linear or cyclic polyorganohydrogensiloxane of any of the above-mentioned formulae (11) to (13) with any of the following compounds:

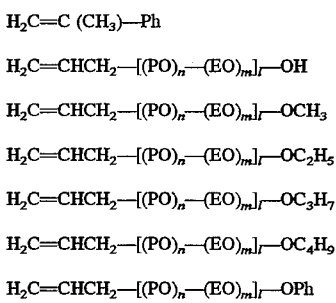

wherein $5 \leq m \leq 80$; $R^{15}$ represents a polyoxyalkylene chain having a molecular weight of from 100 to 10,000, or a hydrocarbon group having from 2 to 20 carbon atoms, optionally having one or more phenyl groups, and

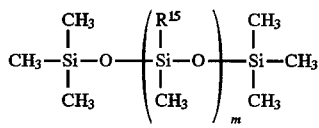

wherein $3 \leq m \leq 20$; $R^{15}$ represents a polyoxyalkylene chain having a molecular weight of from 100 to 10,000, or a hydrocarbon group having from 2 to 20 carbon atoms, optionally having one or more phenyl groups.

The structures of organic compounds for the component (B) other than the above-mentioned linear or cyclic organohydrogenpolysiloxanes are not specifically defined. Preferably employed are organic compounds having at least one hydrosilyl group and having a molecular weight of 30,000 or less, which are represented by the following general formula (14):

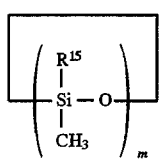

(14)

wherein X represents a group having at least one hydrosilyl group; $R^{18}$ represents a mono-valent to tetra-valent organic group having from 2 to 150 carbon atoms; and a represents an integer of from 1 to 4.

It is possible to use a mixture of the above-mentioned linear or cyclic organohydrogenpolysiloxane and the hydrosilyl group-having organic compound of formula (14).

In formula (14), X represents a group having at least one hydrosilyl group. Examples of the group include hydrosilyl groups as derived from various poly-valent hydrogensioxanes and represented by any of general formulae (15) to (17):

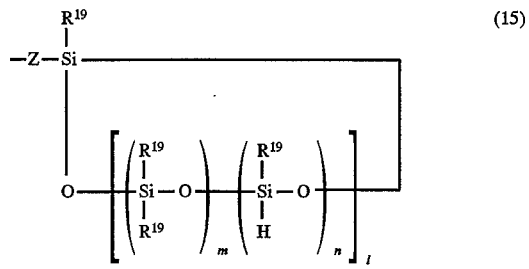

(15)

wherein $1 \leq (m+n) \times l \leq 10$; $n \geq 1$; $R^{19}$ represents any of a methyl group, an ethyl group and a phenyl group; Z represents a divalent substituent having from 0 to 10 carbon atoms and composed of constitutive element(s) selected from only C, H, N, O, S, Si and halogens;

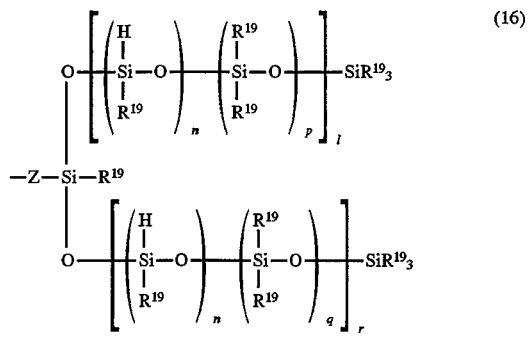

(16)

wherein $1 \leq (m+p) \times l + (n+q) \times r \leq 10$; $m+n \geq 1$; l, p, q, $r \geq 0$; $R^{19}$ represents any of a methyl group, an ethyl group and a phenyl group; Z represents a divalent substituent having from 0 to 10 carbon atoms and composed of constitutive element(s) selected from only C, H, N, O, S, Si and halogens;

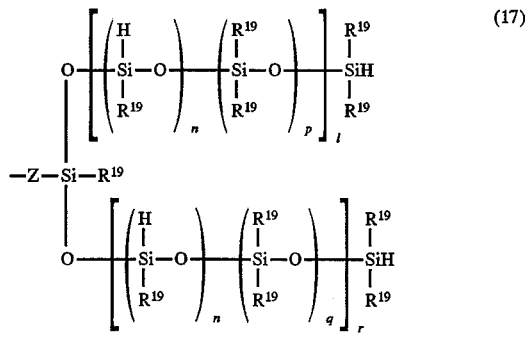

(17)

wherein $0 \leq (m+p) \times l + (n+q) \times r \leq 10$; m, $n \geq 0$; l, p, q, $r \geq 0$; $R^{19}$ represents any of a methyl group, an ethyl group and a phenyl group; Z represents a divalent substituent having from 0 to 10 carbon atoms and composed of constitutive element(s) selected from only C, H, N, O, S, Si and halogens;

and the following hydrosilyl groups:

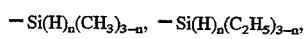
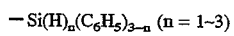
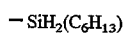
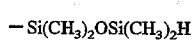
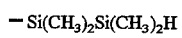
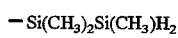
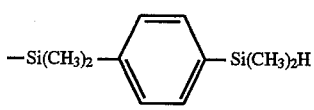
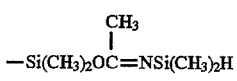
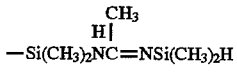
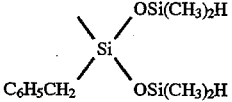

[R = CH$_3$, C$_2$H$_5$, C$_6$H$_5$, Si(CH$_3$)$_3$]

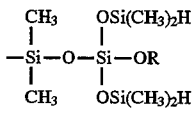 [R = CH$_3$, C$_2$H$_5$, C$_6$H$_5$]

Examples of the divalent substituent Z in formulae (15) to (17) include the following:

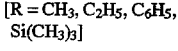
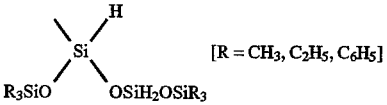
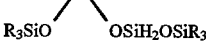

(n: 1 to 10)   (n: 1 to 4).

Two or more of these groups may be bonded to each other through covalent bond to constitute one divalent substituent Z.

As specific examples of the hydrosilyl groups of formulae (15) to (17), mentioned are the following:

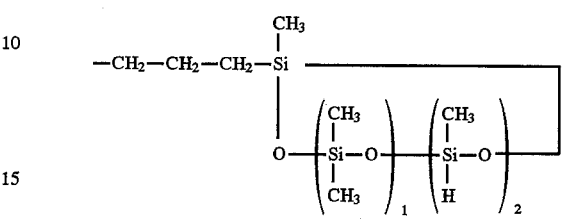
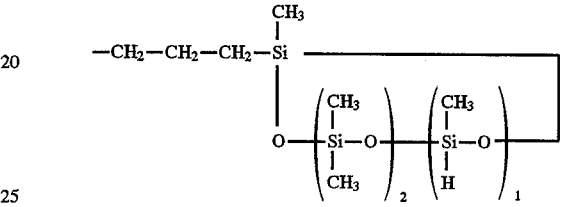
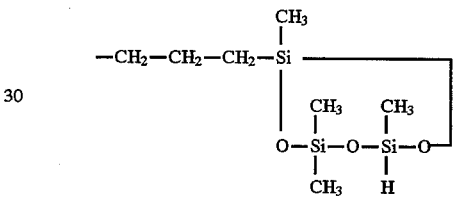
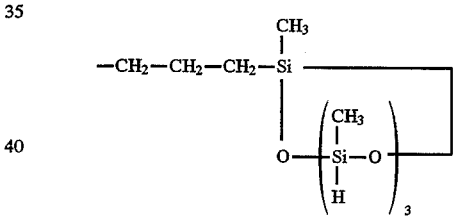
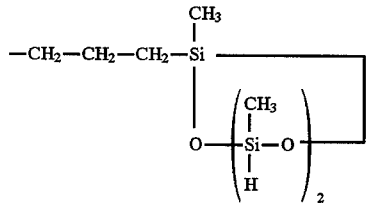
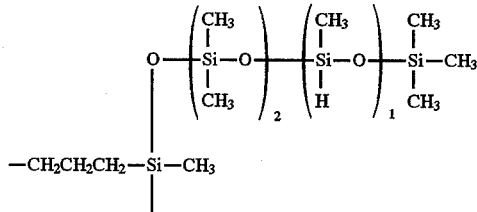
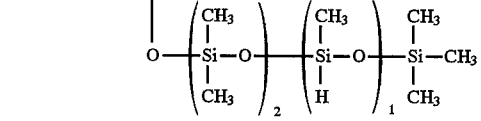

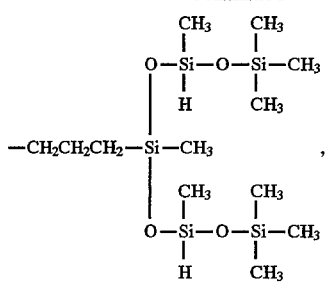

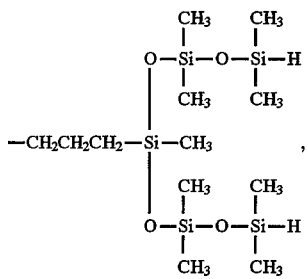

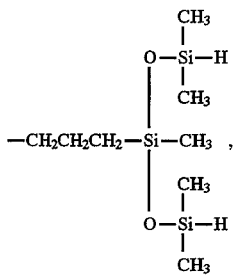

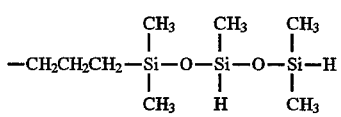

Of the above-mentioned hydrosilyl groups, the following are especially preferred in view of the absence of their negative influence on the compatibility of the component (B) with other components and in view of their high reactivity.

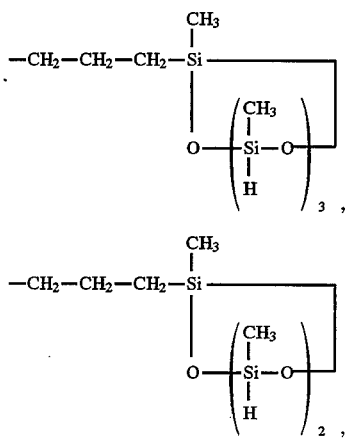

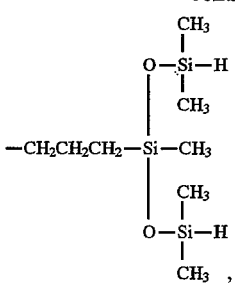

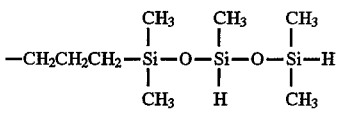

$R^{18}$ in formula (14) is not specifically defined, provided that it is a mono-valent to tetra-valent organic group which is directly bonded to the group X through covalent bond, and examples thereof are as follows:

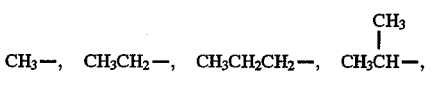

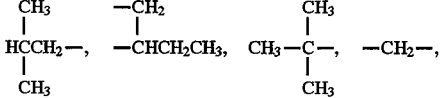

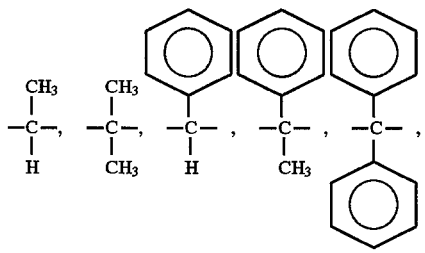

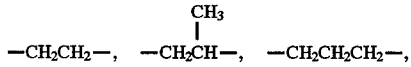

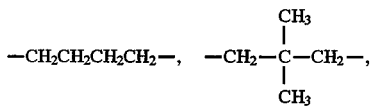

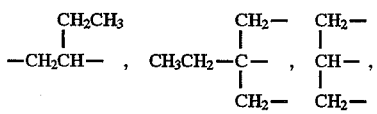

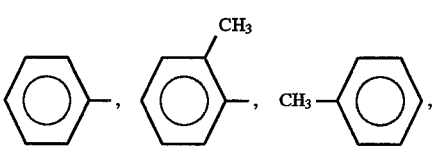

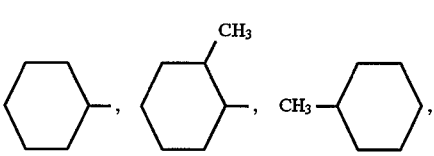

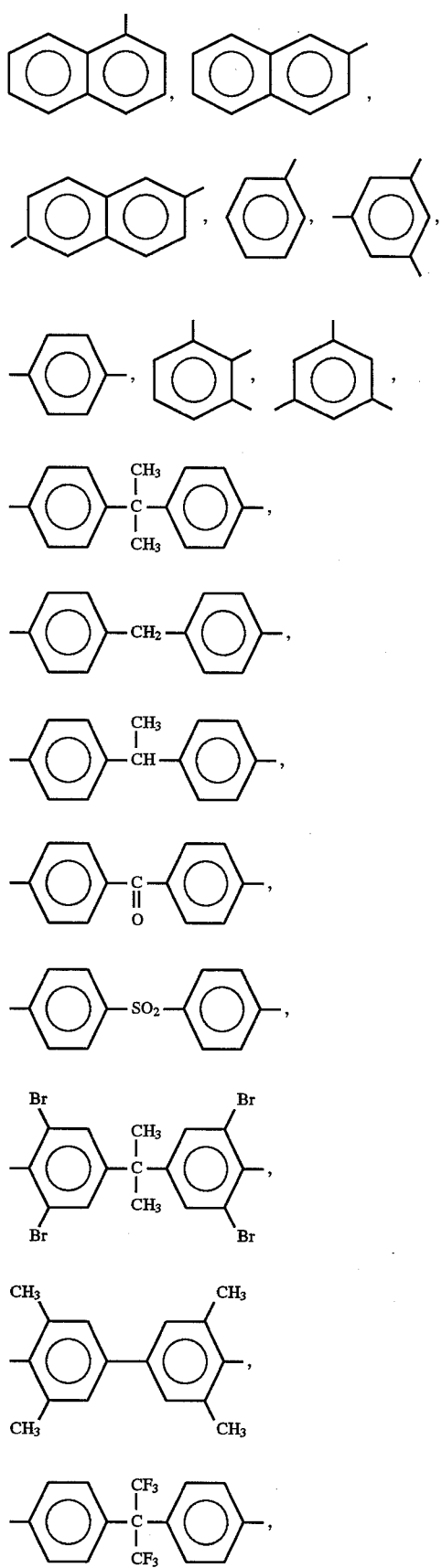
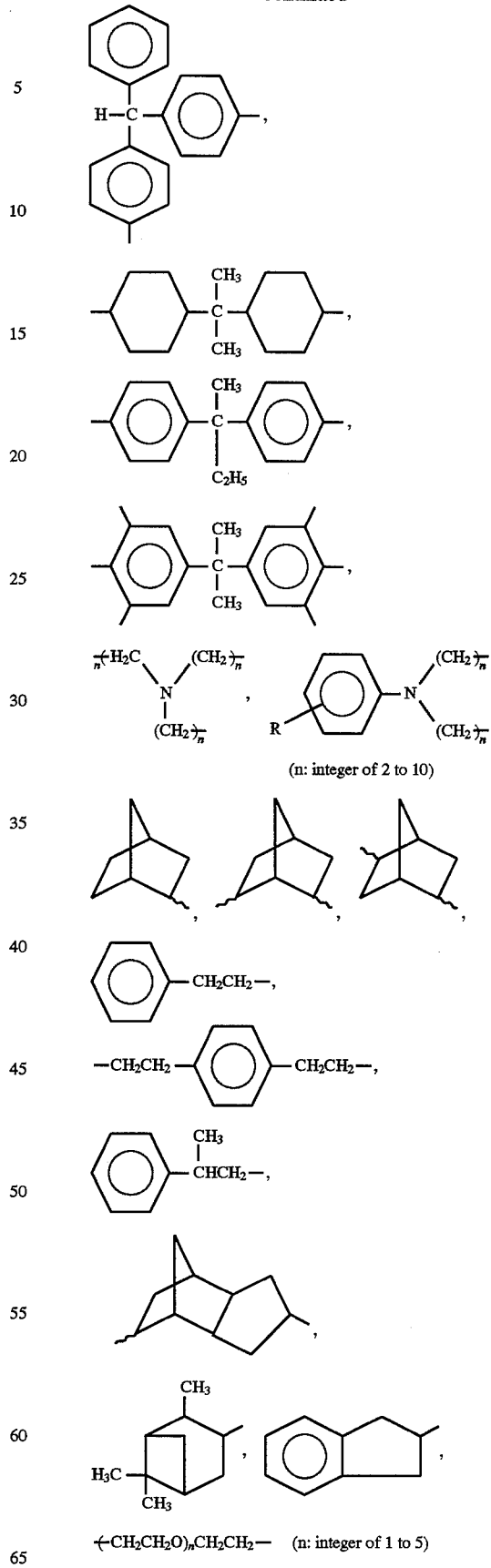

-continued

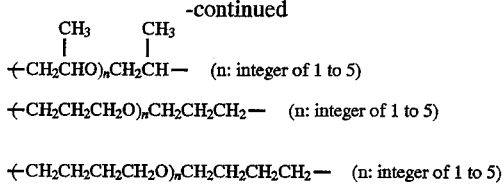

(In the bi-cyclic compounds of the above-mentioned formulae, the waved line indicates any of endo and exo forms.) Of these, preferred are the following, in view of the compatibility of the component (B) with the component (A).

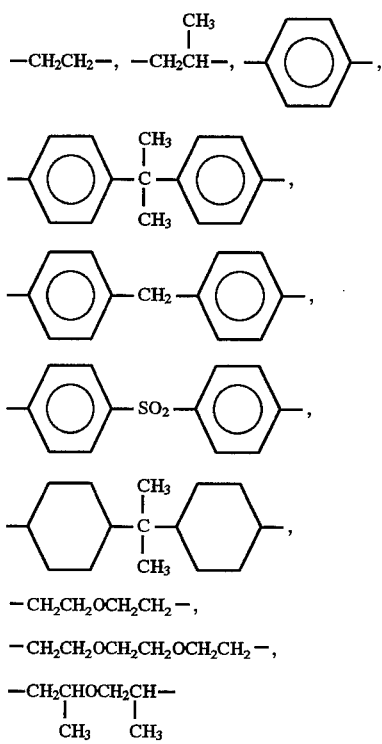

The number of the hydrosilyl groups to be in formula (14) shall be at least one in average in one molecule but is preferably larger, provided that the groups do not interfere with the compatibility of the component (B) with other components. Where the component (A) and the component (B) are cured through hydrosilylation, the curing will be retarded and will be often impossible if the number of the hydrosilyl groups to be in formula (14) for the component (B) is less than 2. Since the component (B) is condensed with the component (C) through dehydrogenation to induce the foaming of the foaming composition of the present invention, the number of the hydrosilyl groups to be in the compound for the component (B) shall be determined in accordance with the intended expansion ratio and is, in general, preferably 3 or more.

The production of the hydrosilyl group-containing organic compounds of formula (14) is not specifically defined, and any known methods can be employed. For example, employable are (i) a method of treating a curing agent precursor having an SiCl group in the molecule with a reducing agent, such as $LiAlH_2$ or $NaBH_4$, to thereby reduce the SiCl group in the precursor into an SiH group; (ii) a method of reacting an organic compound having a functional group X in the molecule with a compound having both a functional group capable of reacting with the functional group X and a hydrosilyl group in the molecule; and (iii) a method of selectively hydrosilylating an organic compound having an alkenyl group with a polyhydrosilane compound having at least two hydrosilyl groups to make the resulting organic compound have at least one hydrosilyl group in the molecule after the reaction.

Of the above-mentioned methods, the method (iii) is preferably employed as being simple. In this method (iii), two or more hydrosilyl groups in some polyhydrosilane compounds are reacted with the alkenyl group of the organic compound, resulting in the increase in the molecular weight of the hydrosilylated products. The products with such an increased molecular weight may also be used for the component (B) with no problem.

More specific examples of the compounds for the component (B) are the following:

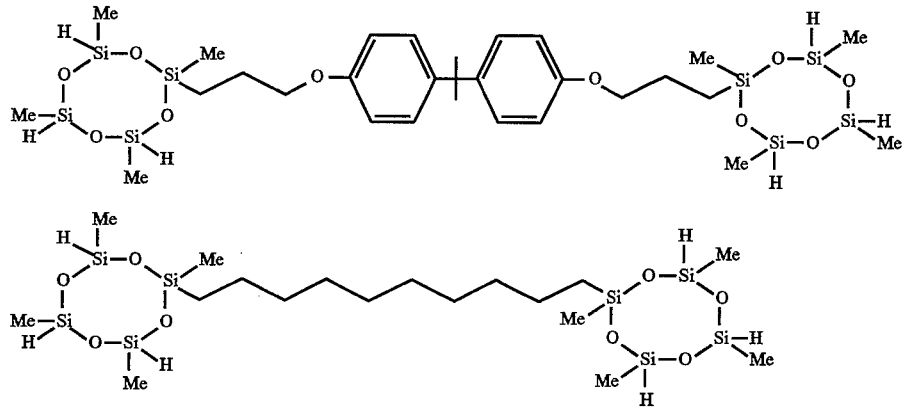

Next, the compound having an OH group for the component (C) is described hereinunder.

The compound having an OH group for use in the present invention is not specifically defined. However, it should not be any of OH-containing (poly)siloxanes which are frequently used in the conventional silicone foam. Preferably, the component (C) comprises an organic compound not having any siloxane bond, which will repel coating compositions, in the molecular skeleton but having an OH group as directly bonded to the carbon atom in the molecule, and/or water. If so, the combination of the component (C) and the component (A) comprising a compound having a carbon-carbon double bond may be more effective. Accordingly, it is desirable that the component (C) comprises a compound having an OH group as directly bonded to the carbon atom in the molecule, such as alcohols and carboxylic acids, and/or water. Specific examples of the compounds for the component (C) include water; mono-alcohols such as methanol, ethanol, n-propanol, iso-propanol, n-butanol, iso-butanol, tert-butanol, ethylene glycol monomethyl ether, ethylene glycol monoethyl ether, ethylene glycol monopropyl ether, ethylene glycol monobutyl ether, diethylene glycol monomethyl ether, ethylene glycol monophenyl ether, ethylene glycol monoallyl ether, and glycerin diallyl ether; poly-alcohols such as ethylene glycol, propylene glycol, 1,4-butylene glycol, 1,3-butylene glycol, 2,3-butylene glycol, diethylene glycol, triethylene glycol, neopentyl glycol, 1,6-hexamethylene glycol, 1,9-nonamethylene glycol, glycerin, trimethylolpropane, pentaerythritol, sorbitol, sucrose, and glycerin monoallyl ether; polyether-polyols (including those containing three or more OH groups in one molecule and starting from initiators such as sorbitol, sucrose, tetraethylenediamine, and ethylenediamine), for example, polypropylene glycol, polyethylene glycol, copolymers of these, and polytetramethylene glycol; polyester-polyols such as adipate polyols, polycaprolactone polyols, and polycarbonate polyols; epoxy-modified polyols; polyetherester-polyols; phenolic polyols such as benzylic ether-type phenol-polyols; fluoropolyols such as LUMIFLON (produced by Asahi Glass Co.); polybutadiene-polyols; hydrogenated polybutadiene-polyols; castor oil-type polyols; halogen-containing flame-retardant polyols; phosphorus-containing flame-retardant polyols, carboxylic acids, for example, saturated monocarboxylic acids such as acetic acid and propionic acid; compounds having a phenolic OH group, such as phenol, cresol, xylenol, resorcinol, catechol, pyrogallol, bisphenol A, bisphenol B, bisphenol S, and phenolic resins; OH-containing vinyl monomers such as 2-hydroxyethyl (meth)acrylate, 2-hydroxypropyl (meth)acrylate, 2-hydroxyethyl vinyl ether, N-methylol-(meth)acrylamide, ARONIX5700 (produced by Toa Synthetic Chemical Industry Co.), 4-hydroxystyrene, HE-10, HE-20, HP-10 and HP-20 (acrylate oligomers having a terminal OH group, produced by Nippon Shokubai Kagaku KK), BLEMMER PP series (polypropylene glycol methacrylate), BLEMMER PE series (polyethylene glycol monomethacrylate), BLEMMER PEP series (polyethylene glycol-polypropylene glycol methacrylate), BLEMMER AP-400 (polypropylene glycol monoacrylate), BLEMMER AE-350 (polyethylene glycol monoacrylate), BLEMMER NKH-5050 (polypropylene glycol-polytrimethylene monoacrylate) and BLEMMER GLM (glycerol monomethacrylate) (all produced by Nippon Oils & Fats Co.), and ε-caprolactone-modified hydroxyalkyl vinyl monomers to be obtained by reaction of a OH-containing vinyl compound and ε-caprolactone (these OH-containing vinyl monomers can be used both for the component (A) and for the component (C)); OH-containing acrylic resins to be obtained by copolymerization of the above-mentioned OH-containing vinyl monomer and acrylic acid, methacrylic acid, or a derivative thereof; and other OH-containing resins such as alkyd resins and epoxy resins.

Of these OH-containing compounds, preferred are compounds having 3 or more carbon atoms and water, since they do not vaporize or gasify due to heat to be generated during curing and therefore do not cause the aggregation, growth and breakage of the bubbles in the plastic foam produced. Specific examples of such preferred compounds include water, n-propanol, iso-propanol, n-butanol, iso-butanol, tert-butanol, ethylene glycol monomethyl ether, ethylene glycol monoethyl ether, ethylene glycol monopropyl ether, ethylene glycol monobutyl ether, and diethylene glycol monomethyl ether. As being not crosslinked during the procedure of the dehydrogenating condensation with an Si—H group, saturated mono-alcohols and water are especially preferred. Above all, most preferred are water and saturated primary alcohols such as n-propanol, n-butanol, ethylene glycol monomethyl ether, diethylene glycol monomethyl ether and ethylene glycol monophenyl ether, as being able to easily react with an SiH group.

OH-containing compounds having a large OH equivalent shall have a large volume. Therefore, if such an OH-containing compound with a large OH equivalent is in the foaming composition of the invention, the composition could not be foamed and expanded at a large expansion ratio. Therefore, it is desirable that the OH-containing compound to be in the composition has a hydroxyl equivalent of from 1 to 33 mmol/g, more preferably from 2.5 to 25 mmol/g, from, the viewpoint of its reactivity.

In order to promote the dehydrogenating condensation of the OH-containing compound with an SiH group, carboxylic acids, such as acetic acid and propionic acid, can be added to the component (C). In order to control the expanding speed, two or more OH-containing compounds can be combined. Preferred examples of the combination include a combination of a primary alcohol such as n-propanol and a secondary alcohol such as iso-propanol; and a combination of a carboxylic acid and a primary alcohol. In order to control the curing time, it is possible to use a dihydroxy or higher polyhydroxy compound, such as ethylene glycol, propylene glycol, 1,4-butanediol or glycerin, and to use a compound having both a carbon-carbon double bond capable of being hydrosilylated and an OH group in the molecule, such as ethylene glycol monoallyl ether, glycerin monoallyl ether, glycerin diallyl ether, pentaerythritol diallyl ether or pentaerythritol triallyl ether.

Where a compound having two or more OH groups in one molecule is used for the component (C), the reaction of the component (B) with the component (C) gives hydrogen gas and produces a crosslinked structure in the product. Therefore, it is possible to use only a small amount of such a compound with two or more OH groups in one molecule in order to control the curing time. However, it is unfavorable to use a large amount of the compound, since the composition containing such a large amount of the compound is cured before being sufficiently foamed and expanded. It is possible to use a compound having both a carbon-carbon double bond and an OH group in one molecule, which therefore acts both as acts both as the component (A) and as the component (C).

The proportions of the three components (A) to (C) to be in the foaming composition of the present invention are not specifically defined but shall be suitably determined, depending on the structures of the components, the intended expansion ratio and the intended physical properties of the plastic foam to be formed from the composition. It is preferable that the ratio of the number of mols (x) of the SiH group in the component (B) to the sum of the number of mols (y) of the carbon-carbon double bond in the component (A) and the number of mols (z) of the OH group in the component (C) is such that x:(y+z)=from 30:1 to 1:30, more preferably x:(y+z)=from 10:1 to 1:10. If the molar ratio of the SiH group is above 30/1 in terms of x/(y+z), the crosslink density in the plastic foam to be obtained is low so that mechanical strength of the plastic foam is low. If it is less than 1/30, the foaming composition cannot be foamed and cured sufficiently.

The ratio of the number of mols (y) of the carbon-carbon double bond in the component (A) to the number of mols (z) of the OH group in the component (C) is not specifically defined but shall be suitably determined depending on the intended expansion ratio and the intended physical properties of the plastic foam to be formed from the foaming composition, the skeleton of the compound for the component (A), and the type of the compound for the component (C). In general, it is preferable that y:z=from 100:1 to 1:100, more preferably from 10:1 to 1:20.

For the foaming composition of the present invention, optionally used are a catalyst for the dehydrogenating condensation of the component (B) and the component (C) and a catalyst for the addition reaction (hydrosilylation) of the component (A) and the component (B).

The catalyst for hydrosilylation includes, for example, a single substance of platinum; a solid platinum as carried on a carrier such as alumina, silica or carbon black; chloroplatinic acid; complexes of chloroplatinic acid with an alcohol, an aldehyde or a ketone; platinum-olefin complexes (e.g., $Pt(CH_2=CH_2)_2(PPh_3)_2$, $Pt(CH_2=CH_2)_2Cl_2$); platinum-vinylsiloxane complexes (e.g., $Pt_n(ViMe_2SiOSiMe_2Vi)_n$, $Pt[(MeViSiO)_4]_m$); platinum-phosphine complexes (e.g., $Pt(PPh_3)_4$, $Pt(PBu_3)_4$); platinum-phosphite complexes (e.g., $Pt[P(OPh)_3]_4$, $Pt[P(OBu)_3]_4$) (in these formulae, Me is a methyl group; Bu is a butyl group; Vi is a vinyl group; Ph is a phenyl group; n and m each are an integer); dicarbonyldichloroplatinum; Karstedt catalysts; platinum-hydrocarbon complexes such as those described in Ashby's U.S. Pat. Nos. 3,159,601 and 3,159,662; and platinum-alcoholate catalysts such as those described in Lamoreaux's U.S. Pat. No. 3,220,972. In addition, platinum chloride-olefin complexes such as those described in Modic's U.S. Pat. No. 3,516,946 are also usable in the present invention. As examples of usable catalysts other than such platinum compounds, mentioned are $RhCl(PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, and $TiCl_4$. Of these, chloroplatinic acid, platinum-olefin complexes and platinum-vinylsiloxane complexes are preferred, in view of their catalytic activity. The above-mentioned catalysts can be used singly or as combined.

The amount of the catalyst to be added to the foaming composition of the present invention is not specifically defined. Preferably, however, it is from $10^{-8}$ to $10^{-1}$ mols, more preferably from $10^{-6}$ to $10^{-2}$ mols, per mol of the SiH group in the composition.

The catalyst can be used together with a promoter which may be selected from phosphine compounds and phosphine complexes. The phosphine compounds include, for example, triphenylphosphine, $PMe_3$, $PEt_3$, $PPr_3$ (where Pr is a propyl group—the same shall apply hereinunder), $P(n-Bu)_3$, $P(cyclo-C_6H_{11})_3$, $P(p-C_6H_4Me)_3$, and $P(o-C_6H_4Me)_3$. The phosphine complexes include, for example, $Cr(CO)_5PPh_3$, $Cr(CO)_4(PPh_3)_2$ (cis- and trans-isomers), $Cr(CO)_3(PPh_3)_3$ (fac- and mer-isomers), Mo- and V-analogs of these Cr compounds, $Fe(CO)_4PPh_3$, $Fe(CO)_3(PPh_3)_2$, Ru- and Os-analogs of these Fe compounds, $COCl_2(PPh_3)$, $RhCl(PPh_3)_3$, $RhCl(CO)(PPh_3)_3$, $IrCl(CO)(PPh_3)_2$, $NiCl_2(PPh_3)_2$, $PdCl_2(PPh_3)_2$, $ptCl_2(pph)_2$, and $ClAu(PPh_3)$. In addition, metal complexes such as complexes of metals, such as those mentioned above, with phosphines except triphenylphosphine can also be effective promoters. Further, phosphites such as $P(OPh)3$, arsines such as $AsPh_3$, and stibins such as $SbPh_3$ can also be effective promoters.

The amount of the promoter to be added is not specifically defined but is preferably from $10^{-2}$ to $10^{-2}$ mols, more preferably from $10^{-1}$ to $10^{-1}$ mols, per mol of the catalyst.

The resin composition of the present invention may further contain, if desired, a filler, an anti-aging agent, a radical inhibitor, an ultraviolet absorbent, an adhesiveness improving agent, a flame retardant, a foam controlling agent such as polydimethylsiloxanepolyalkyleneoxide surfactants or organic surfactants (e.g., polyethylene glycol alkylphenyl ether), an acid or basic compound (this is an additive to be added to control the reaction of SiH group and OH group—the acid retards the condensation, while the base accelerates it), a storage stability improving agent, an ozonization inhibitor, a photostabilizer, a viscosity increasing agent, a plasticizer, a coupling agent, an antioxidant, a thermal stabilizer, an electroconductivity imparting agent, an antistatic agent, a radiation blocking agent, a nucleating agent, a phosphorus-containing, peroxide-decomposing agent, a lubricant, a pigment, a metal inactivating agent, and a physical properties controlling agent, provided that such additives do not detract from the objects and the advantages of the present invention.

Specific examples of the filler include glass fibers, carbon fibers, mica, graphite, diatomaceous earth, terra alba, fumed silica, precipitated silica, silicic anhydride, alumina, carbon black, calcium carbonate, clay, talc, titanium oxide, magnesium carbonate, barium sulfate, quartz, fine aluminium powder, flint powder, zinc powder, inorganic balloons, rubber granules, wood powder, phenolic resins, melamine resins, and polyvinyl chloride resins.

Any ordinary anti-aging agent can be in the composition of the present invention, which includes, for example, citric acid, phosphoric acid and sulfur-containing anti-aging agents.

The sulfur-containing anti-aging agents include mercaptans, salts of mercaptans, sulfide-carboxylates, sulfides such as hindered phenol-type sulfides, polysulfides, salts of dithiocarboxylic acids, thioureas, thiophosphates, sulfonium compounds, thioaldehydes, thioketones, mercaptals, mercaptols, monothio acids, polythio acids, thioamides, and sulfoxides.

The radical inhibitor includes, for example, phenolic radical inhibitors such as 2,2'-methylene-bis(4-methyl-6-t-butylphenol), and tetrakis(methylene-3-(3,5-di-t-butyl-4-hydroxyphenyl)propionate)methane; and amine-type radical inhibitors such as phenyl-β-naphthylamine, α-naphthylamine, N,N'-sec-butyl-p-phenylenediamine, phenothiazine, and N,N'-diphenyl-p-phenylenediamine.

The ultraviolet absorbent includes, for example, 2-(2'-hydroxy-3',5'-di-t-butylphenyl)benzotriazole, and bis(2,2,6, 6-tetramethyl-4-piperidine)sebacate.

As the adhesiveness improving agent, usable are any ordinary adhesives, silane-coupling agents such as aminosilane compounds and epoxysilane compounds, and other known compounds. Specific examples of the adhesiveness improving agent include phenolic resins, epoxy resins, γ-aminopropyltrimethoxysilane, N-(β-aminoethyl) aminopropylmethyldimethoxysilane, chroman-indene resins, rosin ester resins, terpene-phenol resins, α-methylstyrene-vinyltoluene copolymers, polyethylmethylstyrenes, alkyl titanates, and aromatic polyisocyanates.

The flame retardant includes, for example, halogen-containing flame retardants such as tetrabromobisphenol A, tetrabromobisphenol A-epoxide, and decabromodiphenyloxide; phosphorus-containing flame retardants such as triethyl phosphate, tricresyl phosphate, tris(chloroethyl) phosphate, tris(chloropropyl) phosphate, tris(dichlorpropyl) phosphate, ammonium polyphosphate, and red phosphorus; and inorganic flame retardants such as aluminium hydroxide, magnesium hydroxide, antimony trioxide, and antimony pentoxide. These flame retardants can be used singly or as combined.

Next, the method for producing the plastic foam of the present invention is described hereinunder.

The foaming resin composition of the present invention is mixed with a catalyst and optionally additives, then foamed and cured to give plastic foam. The foaming and curing temperature is preferably not higher than 100° C., more preferably nearly room temperature in consideration of the application of the composition for foaming in place. If it is higher than 100° C., the speed of the addition crosslinking (curing) reaction between the component (A) and the component (B) is too high, which could not be well balanced with the foaming of the composition to be induced by the hydrogen gas that is generated through the reaction between the component (B) and the component (C).

To produce the plastic foam of the present invention, it is desirable to employ a method where any one or more of the constitutive components of the foaming resin composition of the invention are previously mixed with a catalyst and optionally additives to give suitable two or more formulations and the resulting formulations are mixed just before use and directly applied onto the surface of a substrate on which the foaming composition is foamed in place, and a method where plural formulations such as those mentioned above are mixed just before use and foamed through injection molding. To mix the components, employable are a hand-mixing method, a method of using an electric power mixer or a static mixer, and a method of mixing them through collision. For foaming in place, preferably employed are a method of using a static mixer and a method of mixing the components through collision.

To prepare two or more formulations by previously mixing any one or more of the constitutive components of the foaming composition with a catalyst and optionally additives, the components to be mixed into separate formulations may be suitably combined, for example, in the manner mentioned bellow. The combinations are not specifically defined, provided that the formulations as combined and mixed previously do not generate hydrogen gas and are not cured before all the components are mixed together. To prepare such plural formulations, example, employable are a method of preparing two formulations, one being a mixture comprised of a part of the component (A) and the component (B), and the other being a mixture comprised of the remaining part of the component (A), the component (C) and a catalyst; a method of preparing two formulations, one being a mixture comprised of the component (A), the component (C) and a catalyst, and the other being only the component (B); and a method of preparing two formulations, one being a mixture comprised of the component (A) and the component (C), and the other being a mixture comprised of the component (B) and a catalyst.

The means of forming the plastic foam of the invention is not also specifically defined, for which are employable various foaming methods that are generally employed in producing polyurethane foam, phenol foam and silicone foam. For example, the foaming resin composition of the present invention can be foamed and cured into plastic foam through extrusion foaming, continuous foaming, injection molding, discontinuous molding, or foaming in place.

For the continuous foaming, for example, employable are a slab foaming method where a foaming composition is freely foamed on paper or plastic film that is being continuously let on a belt conveyer; and a double-conveyer method where a foaming composition is shaped and laminated on a plate of paper, plywood or metal. The injection molding is to inject a foaming composition into a mold having a desired shape where the composition is foamed and cured to give a foam article having the shape corresponding to the shape of the mold. The discontinuous molding is employed for forming a sandwiched panel. For the foaming in place, employable are a simple spraying method of spraying one liquid, a spraying method of spraying two liquids, an injection method of injecting two liquids, and a coating method of coating two liquids. These methods for foaming in place are used essentially for the purpose of heat insulation in buildings.

To foam the foaming resin composition of the present invention, if desired, employable are volatile solvents such as butane, pentane, cyclopentane, cyclohexane, toluene, and flon substituents; inorganic foaming agents such as $NaHCO_3$, $(NH_4)_2CO_3$, $NH_4HCO_3$, $NH_2NO_2$, $Ca(N_3)_2$, and $NaBH_4$; organic foaming agents such as azodicarbonamide, azobisisobutyronitrile, barium azodicarboxylate, dinitrosopentamethylene-tetramine, and p-toluenesulfonylhydrazide; liquefied gas of $CO_2$ or $N_2$; and air and other gases that are introduced into the composition through mechanical agitation for the purpose of mechanically foaming the composition.

The expansion ratio of the plastic foam of the present invention, which is represented by (the volume of the plastic foam per the unit volume thereof)/[(the volume of the plastic foam)-(the volume of the pores in the foam)], is not specifically defined. Preferably, however, the plastic foam shall be expanded at an expansion ratio of 2 times or more, especially preferably 4 times or more, as being able to significantly exhibit its advantageous characteristics.

As has been mentioned hereinabove, since the foaming resin composition of the present invention is foamed at room temperatures or under heat at relatively low temperatures, it can be foamed in place. In addition, the composition does not contain any isocyanate and is therefore not so toxic. Moreover, if the expansion ratio of the plastic foam to be formed from the composition is increased, it is possible to lower the cost of the plastic foam per its unit volume.

According to the method of the present invention which uses the foaming resin composition, it is possible to obtain plastic foam, which has good weather resistance and has good compatibility with coating compositions and adhesives and which does not give any harmful gas when fired.

Moreover, if the composition of the component (A) (the skeleton of the compound, and the molecular weight of the moiety sandwiched between crosslinks) and the proportions of the components constituting the foaming resin composition are suitably selected, it is possible to produce any of soft plastic foam and hard plastic foam. The expansion ratio of the plastic foam can be varied in a broad range including low expansion ratios and high expansion ratios. In addition, if the speed the foaming and that of the crosslinking reaction are controlled while the foaming resin composition is foamed and cured to give plastic foam, it is possible to make the plastic foam have a uniform and fine cellular structure.

BEST MODES OF CARRYING OUT THE INVENTION

Examples of the present invention are mentioned below along with a comparative example.

SYNTHESIS EXAMPLE 1

Polyoxypropylene having a number average molecular weight of 3,000 and sodium hydroxide were mixed at 60° C. and then reacted with bromochloromethane added thereto, whereby the molecular weight of the polymer was increased. Next, allyl chloride was added to this and reacted at 110° C. Thus, the terminal of the polymer was allyl-etherified. This was treated with aluminium silicate, and a pure, terminal-allyletherified polyoxypropylene was obtained.

The polyether had a number average molecular weight of 7,960, and the measurement of its iodine value revealed that the polyether had an olefinic group at 92% of its terminal. The viscosity of the polyether was measured with an E-type viscometer to be 140 poises at 23° C.

SYNTHESIS EXAMPLES 2

Polyoxypropylene (of a triol type) having a number average molecular weight of 3,000 was allylated in the same manner as in Synthesis Example 1 but without increasing its molecular weight. The degree of allylation of the polymer was 87 %. The viscosity of the polymer was 3.5 poises at 23° C.

SYNTHESIS EXAMPLE 3

A one-liter, three-neck flask equipped with a stirring rod, a three way stop-cock and a condenser was prepared. 114 g of bisphenol A, 145 g of potassium carbonate, 140 g of allyl bromide and 250 ml of acetone were put into the flask and stirred at 60° C. for 12 hours. The supernatant of the resulting mixture was taken out, washed with an aqueous solution of sodium hydroxide, using a separating funnel, and then washed with water. The oily layer was dried with sodium sulfate, and the solvent was removed therefrom, using an evaporator. Thus was obtained 126 g of a pale-yellow liquid. Through its $^1$H-NMR, it was found that the product thus obtained is an allylated bisphenol resulting from the allyl-etherification of the OH group of bisphenol A. The yield of the product was 82% and the purity thereof was 95% or higher.

SYNTHESIS EXAMPLE 4

A one-liter, four-neck flask equipped with a stirring rod, a dropping funnel, a condenser with a three way stop-cock at its top, and a thermometer was prepared. 12.3 g of methylhydrogenpolysiloxane (KF-99, produced by Shin-etsu Chemical Co.) (200 mmols in terms of SiH group), 11.5 g of benzothiazole, 60 µl of a solution of platinum-vinylsiloxane complex in xylene ($5.0 \times 10^{-3}$ mmols in terms of platinum atom), and 10 ml of toluene were put into the flask. The resulting mixture was heated at 80° C., and a solution of 7.0 g of propylene oxide-ethylene oxide copolymer that had been modified with a butyl group at one terminal and with an allyl group at the other terminal (20 mmols in terms of vinyl group), as dissolved in 80 ml of toluene, was dropwise added thereto through the dropping funnel over a period of 2 hours. After the addition, this was stirred still at 80° C. for 2 hours. After the disappearance of the peak for the vinyl group in the reaction mixture was confirmed through $^1$H-NMR, the mixture was cooled. 10 g of active charcoal was added to this and stirred at room temperature for 1 hour. The resulting mixture was filtered, and the filtrate was concentrated. Thus was obtained a viscous liquid of polyether-modified methylhydrogenpolysiloxane.

SYNTHESIS EXAMPLE 5

A one-liter, four-neck flask equipped with a stirring rod, a dropping funnel, a condenser with a three way stop-cock at its top, and a thermometer was prepared. 12.3 g of methylhydrogenpolysiloxane (KF-99, produced by Shin-etsu Chemical Co.) (200 mmols in terms of SiH group), 11.5 g of benzothiazole, 60 µl of a solution of platinum-vinylsiloxane complex in xylene ($5.0 \times 10^{-3}$ mmols in terms of platinum atom), and 10 ml of toluene were put into the flask. The resulting mixture was heated at 80° C., and a solution of 80.0 g of propylene oxide-ethylene oxide copolymer that had been modified with a butyl group at one terminal and with an allyl group at the other terminal (50 mmols in terms of vinyl group), as dissolved in 80 ml of toluene, was dropwise added thereto through the dropping funnel over a period of 2 hours. After the addition, this was stirred still at 80° C. for 2 hours. After the disappearance of the peak for the vinyl group in the reaction mixture was confirmed through $^1$H-NMR, the mixture was cooled. 10 g of active charcoal was added to this and stirred at room temperature for 1 hour. The resulting mixture was filtered, and the filtrate was concentrated. Thus was obtained a viscous liquid of polyether-modified methylhydrogenpolysiloxane.

SYNTHESIS EXAMPLE 6

Synthesis of allylated, resol-type phenolic resin:

40 g of resol-type phenolic resin (PL-4567, produced by Gun-ei Chemical Co.) (this is in the form of an aqueous solution having a solid content of 75% by weight, and this has an OH content of 17.8 mmol/g) was put into a four-neck flask equipped with a thermometer, a reflux condenser, a dropping funnel and a stirring motor, and 62.6 g of an aqueous solution of NaOH (50% by weight) was gradually added thereto. This was stirred at 50° C. for 1 hour, and 65.4 g of allyl chloride was dropwise added thereto and reacted at 44° C. for 3 hours. The salt was removed through filtration, and the filtrate was extracted with $CH_2Cl_2$. The extract was neutralized with hydrochloric acid and then washed with water. This was dried with $MgSO_4$, and $CH_2Cl_2$ was removed from this through distillation. Thus was obtained 15 g of a product having an unsaturated group content of 8.0 mmol/g as determined through the measurement of its iodine value.

SYNTHESIS EXAMPLE 7

Synthesis of O-allylated, novolak-type phenolic resin:

36.9 g of novolak-type phenolic resin (PSM4261, produced by Gun-ei Chemical Co.—this has an OH content of 9.71 mmol/g) and 160 ml of acetone were put into a four-neck flask equipped with a thermometer, a reflux condenser, a dropping funnel and a stirring motor, and 50 g of potassium carbonate was added thereto while stirring. Next, 52 g of allyl bromide was dropwise added thereto little by little and then reacted at 55° C. for 6 hours. This was filtered, concentrated and washed with an alkali and an acid in that order. 7.4 g of aluminium silicate was added thereto and stirred. This was filtered and concentrated. Thus was obtained 40 g of a product having an unsaturated group content of 7.3 mmol/g as determined through the measurement of its iodine value. Through its $^1$H-NMR, it was found that the product is an O-allylated, novolak-type phenolic resin (of an allyl ether type) resulting from the allylation of the OH group in the starting resin.

SYNTHESIS EXAMPLE 8

Synthesis of C-allylated, novolak-type phenolic resin:

The allylated, novolak-type phenolic resin as obtained in Synthesis Example 7 was heated at 180° C. for 3 hours while stirring it in a nitrogen atmosphere. Thus was obtained 40 g of a rearranged product having an unsaturated group content of 7.3 mmol/g as determined through the measurement of its iodine value. Through its $^1$H-NMR, it was found that the product is a C-allylated, novolak-type phenolic resin (of an allylphenol type) resulting from the Claisen rearrangement of the allyl group in the starting resin.

Example 1

8.8 g of the allyletherified polyoxypropylene as produced in Synthesis Example 1 (2.0 mmols in terms of vinyl group), 0.63 g of methylhydrogenpolysiloxane (KF-99, produced by Shin-etsu Chemical Co.) (10.0 mmols in terms of SiH group), and 0.3 g of 1-propanol were mixed by stirring them. 24 µl of a solution of platinum-vinylsiloxane complex in xylene ($2.0\times10^{-3}$ mmols in terms of platinum atom) was added to the resulting mixture, stirred and injected into a rectangular parallelepiped container having a known capacity. This was kept therein at 25° C. for 10 minutes and foamed to obtain a mass of soft plastic foam. This was cut along the top of the container, and the weight of the piece was measured to obtain its density. The expansion ratio of the product was obtained, on the basis of the density of the non-foamed mixture as obtained prior to the addition of the catalyst thereto, to be about 10 times. The cross section of the piece was observed with an optical microscope to examine the morphology of the cells therein, from which it was found that the majority of the cross section had a uniform cellular structure comprising cells of from 0.2 to 0.5 mm in size. The percentage of the closed cells in the plastic foam was calculated according to ASTM D-2856 to be 95%.

Example 2

The same components, allyletherified polyoxypropylene, 1-propanol and platinum catalyst, as those in Example 1 were mixed in the same ratio as in Example 1 to prepare a liquid A. On the other hand, the same methylhydrogenpolysiloxane as in Example 1 was prepared as a liquid B. The two liquids A and B were mixed in the same ratio as in Example 1 and jetted out onto a vertical concrete wall through a two-liquid jetting device. The liquid mixture thus jetted out was foamed on the surface of the wall to give a sheet of plastic foam thereon as in Example 1.

Example 3

8.8 g of the allyletherified polyoxypropylene as produced in Synthesis Example 2 (2.0 mmols in terms of vinyl group), 1.1 g of the polyether-modified methylhydrogenpolysiloxane as produced in Synthesis Example 4 (10.0 mmols in terms of SiH group), and 0.48 g of 1-propanol were mixed by stirring them. 72 µl of a solution of platinum-vinylsiloxane complex in xylene ($6.0\times10^{-3}$ mmols in terms of platinum atom) was added to the resulting mixture and mixed, whereby the mixture was foamed to give a mass of soft plastic foam. The expansion ratio of the plastic foam was 10 times.

Example 4

2.2 g of the allylated bisphenol as produced in Synthesis Example 3 (14.0 mmols in terms of vinyl group), 1.2 g of the polyether-modified methylhydrogenpolysiloxane as produced in Synthesis Example 5 (2.0 mmols in terms of SiH group), 1.1 g of methylhydrogenpolysiloxane (18.0 mmols in terms of SiH), and 0.24 g of 1-propanol were mixed by stirring them. 48 µl of the same platinum catalyst solution ($4.0\times10^{-3}$ retools in terms of platinum atom) as in Example 1 was added to the resulting mixture in the same manner as in Example 1. Thus was obtained a mass of hard plastic foam. The expansion ratio of the plastic foam was 10 times.

Example 5

2.2 g of an allyl-bisphenol resulting from the allylation of bisphenol A at its ortho-position (MATRIMID5292B, produced by Ciba-Geigy Co.) (14.0 mmols in terms of vinyl group), 1.2 g of the polyether-modified methylhydrogenpolysiloxane as produced in Synthesis Example 5 (2.0 mmols in terms of SiH group), 1.1 g of methylhydrogenpolysiloxane (18.0 mmols in terms of SiH group), and 0.24 g of 1-propanol were mixed by stirring them. 48 µl of the same platinum catalyst solution ($4.0\times10^{-3}$ mmols in terms of platinum atom) as in Example 1 was added to the resulting mixture in the same manner as in Example 1. Thus was obtained a mass of hard plastic foam. The expansion ratio of the plastic foam was 15 times.

Example 6

2.2 g of an allyl-bisphenol resulting from the allylation of bisphenol A at its ortho-position (2,2'(6')-diallyl-4,4'-isopropylidene-diphenol) (14.0 mmols in terms of vinyl group), 2.2 g of the polyether-modified methylhydrogenpolysiloxane as produced in Synthesis Example 4 (20.0 mmols in terms of SiH group), 0.18 g of 1-propanol, and 0.108 g of distilled water were mixed by stirring them. 48 µl of the same platinum catalyst solution as in Example 1 was added to the resulting mixture in the same manner as in Example 1. Thus was obtained a mass of hard plastic foam. The expansion ratio of the plastic foam was 10 times.

Example 7

1.75 g of allylated resol-type phenolic resin as produced in Synthesis Example 6 (14.0 mmols in terms of vinyl group), 2.2 g of the polyether-modified methylhydrogenpolysiloxane as produced in Synthesis Example 4 (20.0 mmols in terms of SiH group), 0.18 g of 1-propanol, and 0.108 g of distilled water were mixed by stirring them. 48 µl of the same platinum catalyst solution as in Example 1 was added to the resulting mixture in the same manner as in Example 1. Thus was obtained a mass of hard plastic foam. The expansion ratio of the plastic foam was 10 times.

Example 8

1.92 g of the O-allylated, novolak-type phenolic resin as produced in Synthesis Example 7 (14.0 mmols in terms of vinyl groups), 2.2 g of the polyether-modified methylhydrogenpolysiloxane as produced in Synthesis Example 4 (20.0 mmols in terms of SiH group), 0.18 g of 1-propanol, and 0.108 g of distilled water were mixed by stirring them. 48 µl of the same platinum catalyst solution as in Example 1 was added to the resulting mixture in the same manner as in Example 1. Thus was obtained a mass of hard plastic foam. The expansion ratio of the plastic foam was 8 times.

Example 9

1.92 g of the C-allylated, novolak-type phenolic resin as produced in Synthesis Example 8 (14.0 mmols in terms of vinyl groups), 2.2 g of the polyether-modified methylhydrogenpolysiloxane as produced in Synthesis Example 4 (20.0 mmols in terms of SiH group), 0.18 g of 1-propanol, and 0.108 g of distilled water were mixed by stirring them. 48 µl of the same platinum catalyst solution as in Example 1 was added to the resulting mixture in the same manner as in Example 1. Thus was obtained a mass of hard plastic foam. The expansion ratio of the plastic foam was 5 times.

Comparative Example 1

Two-liquid-type silicone RTV foam (SEF-10, produced by Toray Dow Corning Silicone Co.) was processed in accordance with the instructions for the product. Thus was obtained a mass of soft plastic foam, as in Example 1. The expansion ratio of the plastic foam was 10 times, and the diameters of the cells existing in this ranged between 0.5 mm and 0.8 mm.

The characteristic values of the plastic foam samples as obtained in Examples 1 to 6 and Comparative Example 1 are shown in Table 1.

TABLE 1

|  | Example 1 | Example 2 | Example 3 | Example 4 | Example 5 |
|---|---|---|---|---|---|
| Expansion Ratio | 10 | 10 | 10 | 10 | 15 |
| Cell Diameters (mm) | 0.2–0.5 | 0.2–0.5 | 0.2–0.5 | 0.3–0.5 | 0.3–0.5 |
| Hardness | 5 | 6 | 15 | 10 | 30 |
| Compassion Strength (Kg/cm2) | Not measured. | Not measured. | Not measured. | 2.0 | 2.1 |
| Coatability |  |  |  |  |  |
| Aqueous Coating Composition A | Good. | Good. | Good. | Good. | Good. |
| Aqueous Coating Composition B | Good. | Good. | Good. | Good. | Good. |
| Aqueous Coating Composition C | Good. | Good. | Good. | Good. | Good. |
| Adhesiveness | Cohesion failure. Foam broken. | Cohesion failure. Foam broken. | Cohesion failure. Foam broken. | Cohesion failure. Foam broken. | Cohesion failure. Foam broken. |

|  | Example 6 | Example 7 | Example 8 | Example 9 | Comparative Example 1 |
|---|---|---|---|---|---|
| Expansion Ratio | 10 | 10 | 8 | 5 | 10 |
| Cell Diameters (mm) | 0.3–0.6 | 0.3–0.7 | 0.2–0.6 | 0.1–0.4 | 0.5–0.8 |
| Hardness | 30 | 32 | 35 | 40 | 6 |
| Compassion Strength (Kg/cm2) | 2.3 | 2.4 | 2.5 | 2.6 | Not measured. |
| Coatability |  |  |  |  |  |
| Aqueous Coating Composition A | Good. | Good. | Good. | Good. | Bad. |
| Aqueous Coating Composition B | Good. | Good. | Good. | Good. | Bad. |
| Aqueous Coating Composition C | Good. | Good. | Good. | Good. | Bad. |
| Adhesiveness | Cohesion failure. Foam broken. | Cohesion failure. Foam broken. | Cohesion failure. Foam broken. | Cohesion failure. Foam broken. | Cohesion failure. Interface between foam and adhesive broken. |

The characteristic values of the foam samples as shown in Table 1 were measured according to the methods mentioned below.

The hardness was measured on the surface of each sample, using a hardness tester ASKER C Model.

The compression strength was measured in accordance with JIS K7220. (In Table 1, "Not measured" means that the compression strength of the sample was too low and could not be measured herein.)

The coatability was determined by applying each of three aqueous, acrylic coating compositions onto the surface of each sample at room temperature, drying it in air and observing the condition of the coated film with the naked eye.

"Good" means that the coated film was good. "Bad" means that the foam sample repelled the coating composition.

The adhesiveness was determined as follows: A two-liquid-type epoxy adhesive (Cemedine Hi-Super) was applied onto an aluminium test piece, which was then attached to the surface of each foam sample. After having been cured at room temperature for 1 hour, the test piece was peeled by hand, whereupon the condition of the peeled surface of the sample was observed with the naked eye.

INDUSTRIAL APPLICABILITY

The plastic foam of the present invention can be favorably used in various applications, for example, for acoustic insulation, heat insulation, water sealing, air sealing, damping, protection, cushioning, decoration, etc. In particular, it has good weather resistance, and coating compositions and adhesives can be applied thereto. The foaming resin composition of the present invention, from which the plastic foam is produced, is not toxic and relatively inexpensive. As being able to be foamed in place by spraying or injection, the composition is especially useful as sealing materials and interior and exterior materials in civil engineering, building and construction, and as materials for producing model samples, decorations and accessories.

We claim:

1. A foaming resin composition comprising;
   (A) an organic compound having a carbon-carbon double bond but having no siloxane unit in the molecular skeleton,
   (B) a compound having an SiH group, and
   (C) a compound having an OH group.

2. The foaming resin composition as claimed in claim 1, wherein the molecular skeleton of the organic compound for the component (A) is composed of at least one or more element selected from carbon, oxygen, hydrogen, nitrogen, sulfur and halogen atoms.

3. The foaming resin composition as claimed in claim 1, wherein the molecular skeleton of the organic compound for the component (A) is a polyether-type, organic polymer skeleton.

4. The foaming resin composition as claimed in claim 1, wherein the molecular skeleton of the organic compound for the component (A) is a phenol-formaldehyde-type, organic polymer skeleton.

5. The foaming resin composition as claimed in claim 1, wherein the molecular skeleton of the organic compound for the component (A) is a bisphenol-type skeleton.

6. The foaming resin composition as claimed in claim 1, wherein the organic compound for the component (A) has a molecular skeleton of the following formula:

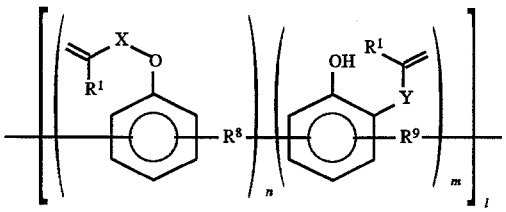

wherein $R^1$ represents H or $CH_3$; $R^8$ and $R^9$ each represent a divalent substituent having from 0 to 6 carbon atoms and composed of constitutive element(s) selected from only C, H, N, O, S and halogens; X and Y each represent a divalent substituent having from 0 to 10 carbon atoms and composed of constitutive element(s) selected from only C, H, N, O, S and halogens; and n, m and l each represent from 1 to 300.

7. The foaming resin composition as claimed in claim 1, wherein the organic compound for the component (A) has a molecular skeleton of the following formula:

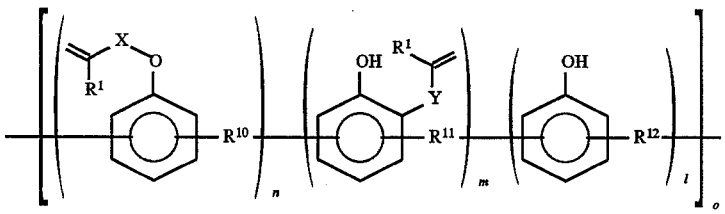

wherein $R^1$ represents H or $CH_3$; $R^{10}$, $R^{11}$ and $R^{12}$ each represent a divalent substituent having from 0 to 6 carbon atoms and composed of constitutive element(s) selected from only C, H, N, O, S and halogens; X and Y each represent a divalent substituent having from 0 to 10 carbon atoms and composed of constitutive element(s) selected from only C, H, N, O, S and halogens; and n, m, l and o each represent from 1 to 300.

8. The foaming resin composition as claimed in claim 1, wherein the organic compound for the component (A) has a molecular skeleton of the following formula:

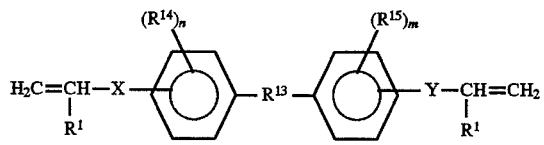

wherein $R^1$ represents H or $CH_3$; $R^{13}$ represents a divalent substituent having from 0 to 6 carbon atoms and composed of constitutive element(s) selected from only C, H, N, O, S and halogens; X and Y each represent a divalent substituent having from 0 to 10 carbon atoms and composed of constitutive element(s) selected from only C, H, N, O, S and halogens; $R^{14}$ and $R^{15}$ each represent a monovalent substituent having from 0 to 10 carbon atoms and composed of constitutive element(s) selected from only C, H, N, O, S and halogens; and n and m each represent from 0 to 4.

9. The foaming resin composition as claimed in any one of claims 1 to 8, wherein the component (C) comprising an OH group-having compound comprises an organic compound with an OH group as directly bonded to the carbon atom therein, and/or water.

10. The foaming resin composition as claimed in any one of claims 1 to 8, wherein the component (C) comprising an OH group-having compound comprises an alcohol and/or water.

11. A method for producing plastic foam, comprising foaming and curing a foaming resin composition as claimed in any one of claims 1 to 8, at 100° C. or lower.

12. Plastic foam as produced by foaming and curing a foaming resin composition as claimed in any one of claims 1 to 8, at 100° C. or lower.

13. A method for producing plastic foam by foaming in place a foaming resin composition as claimed in any one of claims 1 to 8, wherein the components (A) to (C) of the composition are mixed just before use, then directly applied onto the surface of a substrate and foamed thereon.

14. A method for producing plastic foam by foaming a foaming resin composition as claimed in any one of claims 1 to 8, wherein the components (A) to (C) of the composition are mixed just before use and foamed through injection.

* * * * *